(12) United States Patent
Wang et al.

(10) Patent No.: US 12,301,316 B2
(45) Date of Patent: *May 13, 2025

(54) CHANNEL ESTIMATION METHOD AND APPARATUS

(71) Applicant: HUAWEI TECHNOLOGIES CO., LTD., Shenzhen (CN)

(72) Inventors: Xiaohan Wang, Shanghai (CN); Huangping Jin, Shanghai (CN); Xiang Ren, Boulogne Billancourt (FR); Wei Han, Shanghai (CN); Xiaoyan Bi, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/440,664

(22) Filed: Feb. 13, 2024

(65) Prior Publication Data

US 2024/0187053 A1 Jun. 6, 2024

Related U.S. Application Data

(63) Continuation of application No. 18/304,132, filed on Apr. 20, 2023, now Pat. No. 11,929,801, which is a
(Continued)

(30) Foreign Application Priority Data

Jan. 25, 2018 (CN) .......................... 201810075250.X

(51) Int. Cl.
*H04L 25/02* (2006.01)
*H04B 7/0417* (2017.01)
*H04B 7/0456* (2017.01)

(52) U.S. Cl.
CPC ....... *H04B 7/0456* (2013.01); *H04L 25/0204* (2013.01); *H04B 7/0417* (2013.01)

(58) Field of Classification Search
CPC .. H04B 7/0417; H04B 7/0456; H04L 25/0204
(Continued)

(56) References Cited

U.S. PATENT DOCUMENTS

| 2003/0114169 A1* | 6/2003 | Okamura .............. H04W 64/00 455/457 |
| 2007/0115799 A1 | 5/2007 | Ting et al. |

(Continued)

FOREIGN PATENT DOCUMENTS

| CN | 101127747 A | 2/2008 |
| CN | 101997649 A | 3/2011 |

(Continued)

OTHER PUBLICATIONS

U.S. Appl. No. 18/304,132, filed Apr. 20, 2023.
(Continued)

*Primary Examiner* — Ted M Wang
(74) *Attorney, Agent, or Firm* — Leydig, Voit & Mayer, Ltd.

(57) ABSTRACT

Embodiments of this application disclose a channel estimation method and apparatus, and relate to the field of communications technologies, to help reduce indication overheads. The method may include: generating and sending indication information, where the indication information is used to indicate M N-dimensional precoding vectors, each precoding vector is applied to one of M frequency bands, the M N-dimensional precoding vectors form a space-frequency matrix, and the space-frequency matrix is generated by performing weighted combination on a plurality of space-frequency component matrices, where the space-frequency matrix is an M×N-dimensional space-frequency vector or an
(Continued)

X×Y space-frequency matrix, X and Y are one and the other of M and N, $M \geq 1$, $N \geq 2$, and both M and N are integers.

25 Claims, 4 Drawing Sheets

Related U.S. Application Data continuation of application No. 17/483,419, filed on Sep. 23, 2021, now Pat. No. 11,658,709, which is a continuation of application No. 16/938,582, filed on Jul. 24, 2020, now Pat. No. 11,139,869, which is a continuation of application No. PCT/CN2019/070904, filed on Jan. 8, 2019.

(58) Field of Classification Search
USPC .......................................................... 375/267
See application file for complete search history.

(56) References Cited

U.S. PATENT DOCUMENTS

| | | | |
|---|---|---|---|
| 2008/0095259 A1 | 4/2008 | Dyer et al. | |
| 2009/0052357 A1 | 2/2009 | Suo et al. | |
| 2010/0284351 A1 | 11/2010 | Liang et al. | |
| 2011/0249637 A1 | 10/2011 | Hammarwall et al. | |
| 2016/0065279 A1 | 3/2016 | Wang et al. | |
| 2016/0080052 A1 | 3/2016 | Li et al. | |
| 2017/0099093 A1 | 4/2017 | Zhang et al. | |
| 2017/0212210 A1* | 7/2017 | Chen | G01S 5/06 |
| 2017/0302353 A1 | 10/2017 | Rahman et al. | |
| 2017/0367067 A1 | 12/2017 | Hwang et al. | |
| 2019/0165841 A1 | 5/2019 | Dong et al. | |

FOREIGN PATENT DOCUMENTS

| | | | |
|---|---|---|---|
| CN | 102823153 A | 12/2012 | |
| CN | 102882575 A | 1/2013 | |
| CN | 107508621 A | 12/2017 | |
| CN | 110086732 A | 8/2019 | |
| JP | 2018532290 A | 11/2018 | |
| KR | 20050107767 A | 11/2005 | |
| KR | 20100130846 A | 12/2010 | |
| WO | 2015180178 A1 | 12/2015 | |

OTHER PUBLICATIONS

U.S. Appl. No. 17/483,419, filed Sep. 23, 2021.
U.S. Appl. No. 16/938,582, filed Jul. 24, 2020.
"The remaining issues for Type II codebook," 3GPP TSG RAN WG1 Meeting #89, Hangzhou, China, R1-1708140, pp. 1-10, 3rd Generation Partnership Project, Valbonne, France (May 15-19, 2017).
"3rd Generation Partnership Project; Technical Specification Group Radio Access Network; NR; Physical layer procedures for data (Release 15)," 3GPP TS 38.214 V15.0.0, pp. 1-71, 3rd Generation Partnership Project, Valbonne, France (Dec. 2017).
"Frequency-parametrization for Type II CSI codebook," 3GPP TSG-RAN WG1 #91, Reno, USA, R1-1720747, pp. 1-8, 3rd Generation Partnership Project, Valbonne, France (Nov. 27-Dec. 1, 2017).

* cited by examiner

CHANNEL ESTIMATION METHOD AND APPARATUS

CROSS-REFERENCE TO RELATED APPLICATIONS

This application is a continuation of U.S. patent application Ser. No. 18/304,132, filed on Apr. 20, 2023, which is a continuation of U.S. patent application Ser. No. 17/483,419, filed on Sep. 23, 2021, now U.S. Pat. No. 11,658,709, which is a continuation of U.S. patent application Ser. No. 16/938,582, filed on Jul. 24, 2020, now U.S. Pat. No. 11,139,869, which is a continuation of International Application No. PCT/CN2019/070904, filed on Jan. 8, 2019. The International Application claims priority to Chinese Patent Application No. 201810075250.X, filed on Jan. 25, 2018. All of the afore-mentioned patent applications are hereby incorporated by reference in their entireties.

TECHNICAL FIELD

Embodiments of this application relate to precoding technologies, and in particular, to a channel estimation method and apparatus.

BACKGROUND

Emergence of the multiple-input multiple-output (MIMO) technology has brought revolutionary changes to wireless communication. The MIMO technology can significantly improve performance of a wireless communications system with a deployment of a plurality of antennas on a transmit end device and a receive end device. For example, in a diversity scenario, the MIMO technology can effectively improve transmission reliability, and in a multiplexing scenario, the MIMO technology can greatly improve a transmission throughput.

In a MIMO system, a precoding technology is usually used to make an improvement to a channel, to enhance a spatial multiplexing effect. In the precoding technology, a precoding matrix matching the channel is used to process data streams to be spatially-multiplexed (briefly referred to as a spatial stream below), to perform precoding to the channel and improve receiving quality of the spatial stream.

Each spatially-multiplexed spatial stream corresponds to one column vector of the precoding matrix. In a precoding process, the transmit end device precodes the spatial stream by using the column vector. Therefore, the column vector may also be referred to as a precoding vector. The precoding vector may be determined by the receive end device based on a space-domain base vector set, and is indicated to the transmit end device. The space-domain base vector set is a set of a series of space-domain base vectors, and each space-domain base vector corresponds to one beam direction of the transmit end device. A space-domain base vector that most matches a channel or a weighted sum of a plurality of space-domain base vectors that most match a channel may be used as a precoding vector, or the precoding vector is adjusted (for example but not limited to reconstruction), and an adjusted precoding vector is used for precoding. Generally, there may be a plurality of spatially-multiplexed spatial streams. Precoding vectors of these spatial streams correspond to column vectors of a precoding matrix.

The precoding vector is usually a precoding vector used to precode one spatial stream in one frequency band. The receive end device usually needs to indicate, to the transmit end device, precoding vectors corresponding to a plurality of frequency bands, and a precoding vector corresponding to each frequency band is independently indicated, causing relatively high indication overheads.

SUMMARY

Embodiments of this application provide a channel estimation method and apparatus, to help reduce indication overheads.

According to a first aspect, an embodiment of this application provides a channel estimation method. The method may include: generating indication information, where the indication information is used to indicate M N-dimensional precoding vectors, each precoding vector is applied to one of M frequency bands, the M N-dimensional precoding vectors form an N×M or M×N space-frequency matrix, and the space-frequency matrix is generated by performing weighted combination on a plurality of space-frequency component matrices, where $M \geq 1$, $N \geq 2$, and both M and N are integers; and sending the indication information. Because the M N-dimensional precoding vectors can form a space-frequency matrix and the space-frequency matrix is generated by performing weighted combination on a plurality of space-frequency component matrices, a condition can be created for reducing indication overheads of the precoding vector. For example, the M N-dimensional precoding vectors can be indicated by indicating the space-frequency matrix. Further, the space-frequency matrix may be indicated by indicating the plurality of space-frequency component matrices. Therefore, compared with a technical solution in the prior art in which a precoding vector corresponding to each frequency band is independently indicated, the technical solution provided in this embodiment of this application helps reduce indication overheads.

The M N-dimensional precoding vectors form an N×M or M×N space-frequency matrix, in other words, the M N-dimensional precoding vectors form an X×Y space-frequency matrix, where X and Y are one and the other of M and N.

According to a second aspect, an embodiment of this application provides a channel estimation method. The method may include: receiving indication information, where the indication information is used to indicate M N-dimensional precoding vectors, each precoding vector is applied to one of M frequency bands, the M N-dimensional precoding vectors form an N×M or M×N space-frequency matrix, and the space-frequency matrix is generated by performing weighted combination on a plurality of space-frequency component matrices, where $M \geq 1$, $N \geq 2$, and both M and N are integers; and determining the M N-dimensional precoding vectors based on the indication information.

It should be noted that in either the first aspect or the second aspect and any one of the following possible designs of the first aspect or the second aspect, the space-frequency matrix is specifically a space-frequency matrix in a narrow sense described below.

Based on the first aspect or the second aspect:

In a possible design, each space-frequency component matrix is selected from a space-frequency component matrix set, or is generated by performing weighted combination on a plurality of space-frequency base matrices selected from a space-frequency base matrix set.

In a possible design, if each space-frequency component matrix is selected from the space-frequency component matrix set, the indication information is specifically used to indicate: the plurality of space-frequency component matrices and a weight of each of the plurality of space-frequency component matrices.

In a possible design, if each space-frequency component matrix is generated by performing weighted combination on the plurality of space-frequency base matrices selected from the space-frequency base matrix set, the indication information is specifically used to indicate: a plurality of space-frequency base matrices corresponding to each of the plurality of space-frequency component matrices, and weight information. The weight information includes weights of the plurality of space-frequency base matrices and a weight of the space-frequency component matrix. Alternatively, the weight information includes weights obtained by separately multiplying weights of the plurality of space-frequency base matrices by a weight of the space-frequency component matrix. In this way, indication overheads can be reduced.

In a possible design, each of the plurality of space-frequency component matrices is constructed based on two vectors, where one of the two vectors is constructed based on an N-dimensional space-domain component vector, and the other one is constructed based on an M-dimensional frequency-domain component vector. For example, when the space-frequency matrix is an N×M space-frequency matrix, each of the plurality of space-frequency component matrices is a product of an N-dimensional space-domain component vector and a conjugate transpose vector of an M-dimensional frequency-domain component vector. For example, when the space-frequency matrix is an M×N space-frequency matrix, each of the plurality of space-frequency component matrices is a product of an M-dimensional frequency-domain component vector and a conjugate transpose vector of an N-dimensional space-domain component vector. Apparently, this application is not limited thereto.

In a possible design, each space-domain component vector is selected from a space-domain component vector set, or is generated by performing weighted combination on a plurality of space-domain base vectors selected from a space-domain base vector set.

In a possible design, each frequency-domain component vector is selected from a frequency-domain component vector set, or is generated by performing weighted combination on a plurality of frequency-domain base vectors selected from a frequency-domain base vector set.

In a possible design, if each space-domain component vector is selected from the space-domain component vector set, and each frequency-domain component vector is selected from the frequency-domain component vector set, the indication information is specifically used to indicate: a space-domain component vector and a frequency-domain component vector corresponding to each of the plurality of space-frequency component matrices, and a weight of the space-frequency component matrix.

In a possible design, if each space-domain component vector is selected from the space-domain component vector set, and each frequency-domain component vector is generated by performing weighted combination on the plurality of frequency-domain base vectors, the indication information is specifically used to indicate: a space-domain component vector and a plurality of frequency-domain base vectors corresponding to each of the plurality of space-frequency component matrices, and weight information. The weight information includes weights of the plurality of frequency-domain base vectors and a weight of the space-frequency component matrix. Alternatively, the weight information includes weights obtained by separately multiplying weights of the plurality of frequency-domain base vectors by a weight of the space-frequency component matrix. In this way, indication overheads can be reduced.

In a possible design, if each space-domain component vector is generated by performing weighted combination on the plurality of space-domain base vectors, and each frequency-domain component vector is selected from the frequency-domain component vector set, the indication information is specifically used to indicate: a frequency-domain component vector and a plurality of space-domain base vectors corresponding to each of the plurality of space-frequency component matrices, and weight information. The weight information includes weights of the plurality of space-domain base vectors and a weight of the space-frequency component matrix. Alternatively, the weight information includes weights obtained by separately multiplying weights of the plurality of space-domain base vectors by a weight of the space-frequency component matrix. In this way, indication overheads can be reduced.

In a possible design, if each space-domain component vector is generated by performing weighted combination on the plurality of space-domain base vectors, and each frequency-domain component vector is generated by performing weighted combination on the plurality of frequency-domain base vectors, the indication information is specifically used to indicate: a plurality of space-domain base vectors and a plurality of frequency-domain base vectors corresponding to each of the plurality of space-frequency component matrices, and weight information. The weight information includes weights of the plurality of space-domain base vectors, weights of the plurality of frequency-domain base vectors, and a weight of the space-frequency component matrix. Alternatively, the weight information includes weights obtained by separately multiplying weights of the plurality of space-domain base vectors by a weight of the space-frequency component matrix, and weights of the plurality of frequency-domain base vectors. In this way, indication overheads can be reduced. Alternatively, the weight information includes weights obtained by separately multiplying weights of the plurality of frequency-domain base vectors by a weight of the space-frequency component matrix, and weights of the plurality of space-domain base vectors. In this way, indication overheads can be reduced.

In a possible design, any one of the foregoing indication information includes at least one piece of sub-information, each of the at least one piece of sub-information is used to indicate at least one piece of information indicated by any indication information, and sending periods of at least two pieces of sub-information are different or sending periods of all pieces of sub-information are the same.

In a possible design, when each space-domain component vector is generated by performing weighted combination on the plurality of space-domain base vectors, each of the plurality of space-frequency component matrices corresponds to a same group of space-domain base vectors. In this way, indication overheads can be reduced.

In a possible design, when each frequency-domain component vector is generated by performing weighted combination on the plurality of frequency-domain base vectors, each of the plurality of space-frequency component matrices corresponds to a same group of frequency-domain base vectors. In this way, indication overheads can be reduced.

In a possible design, the frequency-domain base vector in the frequency-domain base vector set is a column vector of a DFT matrix, or a column vector of an SVD unitary matrix. The DFT matrix may be one-dimensional DFT matrix, or an oversampled one-dimensional DFT matrix.

According to a third aspect, an embodiment of this application provides a channel estimation method. The method may include: generating indication information, where the indication information is used to indicate M N-dimensional precoding vectors, each precoding vector is applied to one of M frequency bands, the M N-dimensional precoding vectors form an M×N-dimensional space-frequency vector, and the space-frequency vector is generated by performing weighted combination on a plurality of space-frequency component vectors, where M≥1, N≥2, and both M and N are integers; and sending the indication information.

According to a fourth aspect, an embodiment of this application provides a channel estimation method. The method may include: receiving indication information, where the indication information is used to indicate M N-dimensional precoding vectors, each precoding vector is applied to one of M frequency bands, the M N-dimensional precoding vectors form an M×N-dimensional space-frequency vector, and the space-frequency vector is generated by performing weighted combination on a plurality of space-frequency component vectors, where M≥1, N≥2, and both M and N are integers; and determining the M N-dimensional precoding vectors based on the indication information.

Based on the third aspect or the fourth aspect:

In a possible design, each space-frequency component vector is selected from a space-frequency component vector set, or is generated by performing weighted combination on a plurality of space-frequency base vectors selected from a space-frequency base vector set.

In a possible design, if each space-frequency component vector is selected from the space-frequency component vector set, the indication information is specifically used to indicate: the plurality of space-frequency component vectors and a weight of each of the plurality of space-frequency component vectors.

In a possible design, if each space-frequency component vector is generated by performing weighted combination on the plurality of space-frequency base vectors selected from the space-frequency base vector set, the indication information is specifically used to indicate: a plurality of space-frequency base vectors corresponding to each of the plurality of space-frequency component vectors, and weight information. The weight information includes: weights of the plurality of space-frequency base vectors and a weight of the space-frequency component vector. Alternatively, the weight information includes weights obtained by separately multiplying weights of the plurality of space-frequency base vectors by a weight of the space-frequency component vector. In this way, indication overheads can be reduced.

In a possible design, a space-frequency component vector is constructed by using a Kronecker product of two vectors. One of the two vectors is constructed based on an N-dimensional space-domain component vector, and the other one is constructed based on an M-dimensional frequency-domain component vector. For example, a space-frequency component vector is a Kronecker product of an N-dimensional space-domain component vector and an M-dimensional frequency-domain component vector. For example, a space-frequency component vector is a Kronecker product of an M-dimensional frequency-domain component vector and an N-dimensional space-domain component vector. Apparently, this application is not limited thereto.

In a possible design, each space-domain component vector is selected from a space-domain component vector set, or is generated by performing weighted combination on a plurality of space-domain base vectors selected from a space-domain base vector set.

In a possible design, each frequency-domain component vector is selected from a frequency-domain component vector set, or is generated by performing weighted combination on a plurality of frequency-domain base vectors selected from a frequency-domain base vector set.

In a possible design, if each space-domain component vector is selected from the space-domain component vector set, and each frequency-domain component vector is selected from the frequency-domain component vector set, the indication information is specifically used to indicate: a space-domain component vector and a frequency-domain component vector corresponding to each of the plurality of space-frequency component vectors, and a weight of the space-frequency component vector.

In a possible design, if each space-domain component vector is selected from the space-domain component vector set, and each frequency-domain component vector is generated by performing weighted combination on the plurality of frequency-domain base vectors, the indication information is specifically used to indicate: a space-domain component vector and a plurality of frequency-domain base vectors corresponding to each of the plurality of space-frequency component vectors, and weight information. The weight information includes weights of the plurality of frequency-domain base vectors and a weight of the space-frequency component vector. Alternatively, the weight information includes weights obtained by separately multiplying weights of the plurality of frequency-domain base vectors by a weight of the space-frequency component vector. In this way, indication overheads can be reduced.

In a possible design, if each space-domain component vector is generated by performing weighted combination on the plurality of space-domain base vectors, and each frequency-domain component vector is selected from the frequency-domain component vector set, the indication information is specifically used to indicate: a frequency-domain component vector and a plurality of space-domain base vectors corresponding to each of the plurality of space-frequency component vectors, and weight information. The weight information includes weights of the plurality of space-domain base vectors and a weight of the space-frequency component vector. Alternatively, the weight information includes weights obtained by separately multiplying weights of the plurality of space-domain base vectors by a weight of the space-frequency component vector. In this way, indication overheads can be reduced.

In a possible design, if each space-domain component vector is generated by performing weighted combination on the plurality of space-domain base vectors, and each frequency-domain component vector is generated by performing weighted combination on the plurality of frequency-domain base vectors, the indication information is specifically used to indicate: a plurality of space-domain base vectors and a plurality of frequency-domain base vectors corresponding to each of the plurality of space-frequency component vectors, and weight information. The weight information includes weights of the plurality of space-domain base vectors, weights of the plurality of frequency-domain base vectors, and a weight of the space-frequency component vector. Alternatively, the weight information includes weights obtained by separately multiplying weights of the plurality of space-domain base vectors by a weight of the space-frequency component vector, and weights of the plurality of frequency-domain base vectors. In this way, indication overheads can be reduced. Alternatively, the weight information includes weights obtained by separately multiplying weights of the plurality of frequency-domain base vectors by a weight of the space-frequency component vector, and weights of the plurality of space-domain base vectors. In this way, indication overheads can be reduced.

In a possible design, any one of the foregoing indication information includes at least one piece of sub-information, each of the at least one piece of sub-information is used to indicate at least one piece of information indicated by any indication information, and sending periods of at least two pieces of sub-information are different or sending periods of all pieces of sub-information are the same.

In a possible design, when each space-domain component vector is generated by performing weighted combination on the plurality of space-domain base vectors, each of the plurality of space-frequency component vectors corresponds to a same group of space-domain base vectors. In this way, indication overheads can be reduced.

In a possible design, when each frequency-domain component vector is generated by performing weighted combination on the plurality of frequency-domain base vectors, each of the plurality of space-frequency component vectors corresponds to a same group of frequency-domain base vectors. In this way, indication overheads can be reduced.

In a possible design, the frequency-domain base vector in the frequency-domain base vector set is a column vector of a DFT matrix, or a column vector of an SVD unitary matrix. The DFT matrix may be one-dimensional DFT matrix, or an oversampled one-dimensional DFT matrix.

According to a fifth aspect, an embodiment of this application provides a channel estimation apparatus. The channel estimation apparatus may be configured to perform any method according to the first aspect or the third aspect. The channel estimation apparatus may be specifically a receive end device, for example, a network device or a terminal.

In a possible design, the channel estimation apparatus may be divided into functional modules according to the method provided in the first aspect or the third aspect. For example, the functional modules may be obtained through division corresponding to each function, or two or more functions may be integrated into one processing module.

In another possible design, the channel estimation apparatus may include a memory and a processor. The memory is configured to store a computer program, and when the computer program is executed by the processor, any method provided in the first aspect or the third aspect is performed.

According to a sixth aspect, an embodiment of this application provides a channel estimation apparatus. The channel estimation apparatus may be configured to perform any method according to the second aspect or the fourth aspect. The channel estimation apparatus may be specifically a transmit end device, for example, a terminal or a network device.

In a possible design, the channel estimation apparatus may be divided into functional modules according to the method provided in the second aspect or the fourth aspect. For example, the functional modules may be obtained through division corresponding to each function, or two or more functions may be integrated into one processing module.

In another possible design, the channel estimation apparatus may include a memory and a processor. The memory is configured to store a computer program, and when the computer program is executed by the processor, any method provided in the second aspect or the fourth aspect is performed.

It should be noted that the memory and the processor described in the embodiments of this application may be integrated into one chip, or may be separately disposed in different chips. A type of the memory and disposing manners of the memory and the processor are not limited in the embodiments of this application.

According to a seventh aspect, an embodiment of this application provides a processor, where the processor may include:

at least one circuit, configured to generate indication information, where the indication information is used to indicate M N-dimensional precoding vectors, and each precoding vector is applied to one of M frequency bands, the M N-dimensional precoding vectors form an N×M space-frequency matrix or an M×N space-frequency matrix, and the space-frequency matrix is generated by performing weighted combination on a plurality of space-frequency component matrices, or the M N-dimensional precoding vectors form an M×N-dimensional space-frequency vector, and the space-frequency vector is generated by performing weighted combination on a plurality of space-frequency component vectors, where $M≥1$, $N≥2$, and both M and N are integers.

The at least one circuit is configured to send the indication information by using a transmitter.

According to an eighth aspect, an embodiment of this application provides a processor, where the processor may include:

at least one circuit, configured to receive indication information by using a receiver, where the indication information is used to indicate M N-dimensional precoding vectors, each precoding vector is applied to one of M frequency bands, the M N-dimensional precoding vectors form an N×M space-frequency matrix or an M×N space-frequency matrix, and the space-frequency matrix is generated by performing weighted combination on a plurality of space-frequency component matrices, or the M N-dimensional precoding vectors form an M×N-dimensional space-frequency vector, and the space-frequency vector is generated by performing weighted combination on a plurality of space-frequency component vectors, where $M≥1$, $N≥2$, and both M and N are integers.

The at least one circuit is configured to determine the M N-dimensional precoding vectors based on the indication information.

According to a ninth aspect, an embodiment of this application provides a processing device, including: a transmitter and a processor. The processor is configured to: generate indication information, and send the indication information by using the transmitter. The M N-dimensional precoding vectors form an N×M space-frequency matrix or an M×N space-frequency matrix, and the space-frequency matrix is generated by performing weighted combination on a plurality of space-frequency component matrices. The M N-dimensional precoding vectors form an M×N-dimensional space-frequency vector, and the space-frequency vector is generated by performing weighted combination on a plurality of space-frequency component vectors. $M≥1$, $N≥2$, and both M and N are integers.

According to a tenth aspect, an embodiment of this application provides a processing device, including a receiver and a processor. The processor is configured to receive indication information by using the receiver, where the M N-dimensional precoding vectors form an N×M space-frequency matrix or an M×N space-frequency matrix, and the space-frequency matrix is generated by performing weighted combination on a plurality of space-frequency component matrices. Alternatively, the M N-dimensional precoding vectors form an M×N-dimensional space-frequency vector, and the space-frequency vector is generated by performing weighted combination on a plurality of space-frequency component vectors. M≥1, N≥2, and both M and N are integers. The processor may be further configured to determine the M N-dimensional precoding vectors based on the indication information.

In a specific implementation process, the processor may be configured to perform, for example but not limited to, baseband-related processing, and the receiver and the transmitter may be configured to perform, for example but not limited to, radio frequency sending and receiving. The foregoing components may be separately disposed on chips independent of each other, or at least some or all of the components may be disposed on a same chip. For example, the receiver and the transmitter may be disposed on a receiver chip and a transmitter chip that are independent of each other, or may be integrated into a transceiver and then disposed on a transceiver chip. For example, the processor may be further classified into an analog baseband processor and a digital baseband processor. The analog baseband processor and the transceiver may be integrated into a same chip, and the digital baseband processor may be disposed on an independent chip. With continuous development of integrated circuit technologies, more components can be integrated into a same chip. For example, the digital baseband processor and a plurality of types of application processors (for example but not limited to, a graphics processing unit, a multimedia processor, and the like) may be integrated into a same chip. Such a chip may be referred to as a system on chip. Whether all the components are separately disposed on different chips or integrated and disposed on one or more chips usually depends on a specific requirement of product design. A specific implementation of the components is not limited in the embodiments of this application.

An embodiment of this application further provides a computer-readable storage medium, where the computer-readable storage medium stores a computer program, and when the computer program is run on a computer, the computer is enabled to perform any one of the possible methods provided in the first aspect to the fourth aspect.

An embodiment of this application further provides a computer program product, where when the computer program product is run on a computer, any one of the methods provided in the first aspect to the fourth aspect is performed.

This application further provides a communications chip, where the communications chip stores an instruction, and when the instruction is run on a network device or a terminal, the network device or the terminal is enabled to perform the method according to any one of the first aspect to the fourth aspect.

It may be understood that any channel estimation apparatus or processor or processing device or computer-readable storage medium or computer program product provided above is configured to perform a corresponding method provided above. Therefore, for beneficial effects that can be achieved by the channel processing apparatus or processor or processing device or computer-readable storage medium or computer program product, refer to the beneficial effects of the corresponding method, and details are not described herein.

It should be noted that, the foregoing devices that are provided in the embodiments of this application and that are configured to store the computer instruction or the computer program, for example but not limited to, the foregoing memory, computer-readable storage medium, and communications chip, are all non-transitory.

DESCRIPTION OF EMBODIMENTS

Technical solutions provided in this application can be applied to various communications systems. The technical solutions provided in this application may be applied to a 5G communications system, a future evolved system, a plurality of converged communications systems, or the like, or may be applied to an existing communications system or the like. The technical solutions provided in this application may be applied to a plurality of application scenarios, such as machine to machine (M2M), macro-micro communication, enhanced mobile Internet (eMBB), ultra-reliable low-latency communication (URLLC), and massive machine-type communications (mMTC). The scenarios may include but are not limited to a scenario of communication between terminals, a scenario of communication between network devices, a scenario of communication between a network device and a terminal, and the like. The following describes the scenario used in communication between a network device and a terminal as an example.

Figure 1:
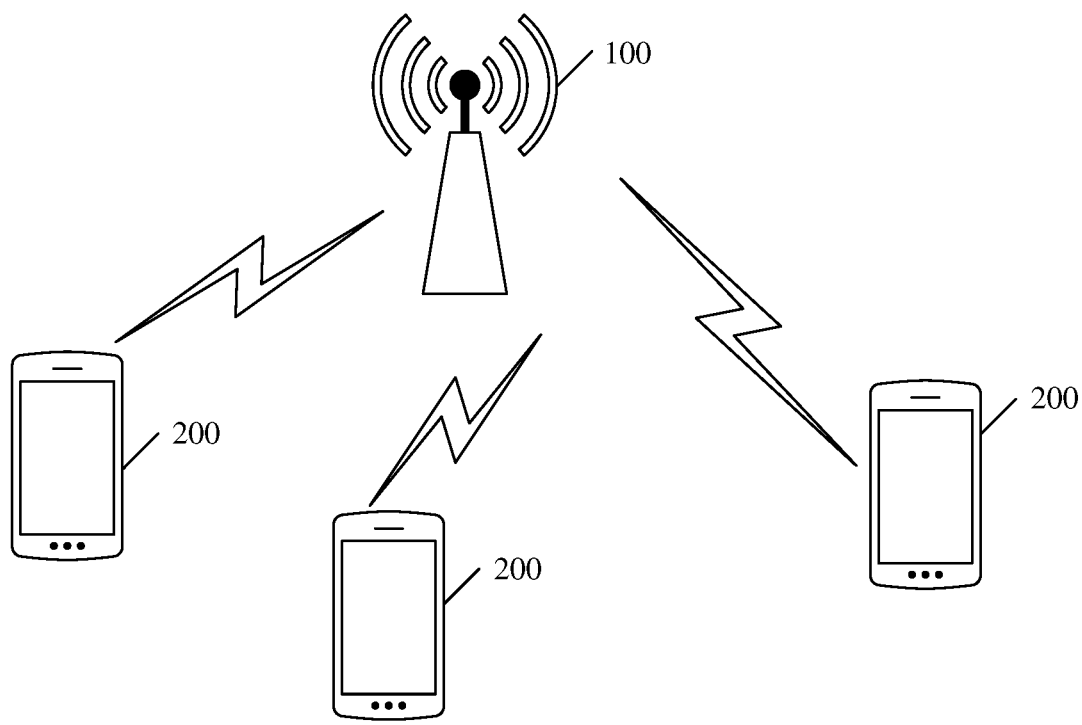
FIG. 1 is an architectural schematic diagram of a communications system to which technical solutions provided in embodiments of this application are applicable.

FIG. 1 is a schematic diagram of a communications system to which the technical solutions provided in this application are applicable. The communications system may include one or more network devices 100 (where only one network device is shown) and one or more terminals 200 connected to each network device 100. FIG. 1 is only a schematic diagram, and does not constitute a limitation on an applicable scenario of the technical solutions provided in this application.

The network device 100 may be a transmission reception point (TRP), a base station, a relay node, an access point, or the like. The network device 100 may be a network device in a 5G communications system or a network device in a future evolved network, or may be a wearable device, a vehicle-mounted device, or the like. In addition, the network device 100 may alternatively be a base transceiver station (BTS) in a global system for mobile communications (GSM) or code division multiple access (CDMA) network, an NB (NodeB) in wideband code division multiple access (WCDMA), or an eNB or an eNodeB (evolutional NodeB) in a long term evolution (LTE). The network device 100 may alternatively be a radio controller in a cloud radio access network (CRAN) scenario.

The terminal 200 may be user equipment (UE), an access terminal, a UE unit, UE station, a mobile station, a remote station, a remote terminal, a mobile device, a UE terminal, a wireless communications device, a UE agent, a UE apparatus, or the like. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal in a 5G network, a terminal in a future evolved public land mobile network (PLMN) network, or the like.

Optionally, the network elements (for example, the network device 100 and the terminal 200) in FIG. 1 may be implemented by one device or may be jointly implemented by a plurality of devices, or may be implemented by a functional module in one device. This is not specifically limited in this embodiment of this application. It can be understood that the foregoing functions may be network elements in a hardware device, or may be software functions running on dedicated hardware, or may be virtualization functions instantiated on a platform (for example, a cloud platform).

Figure 2:
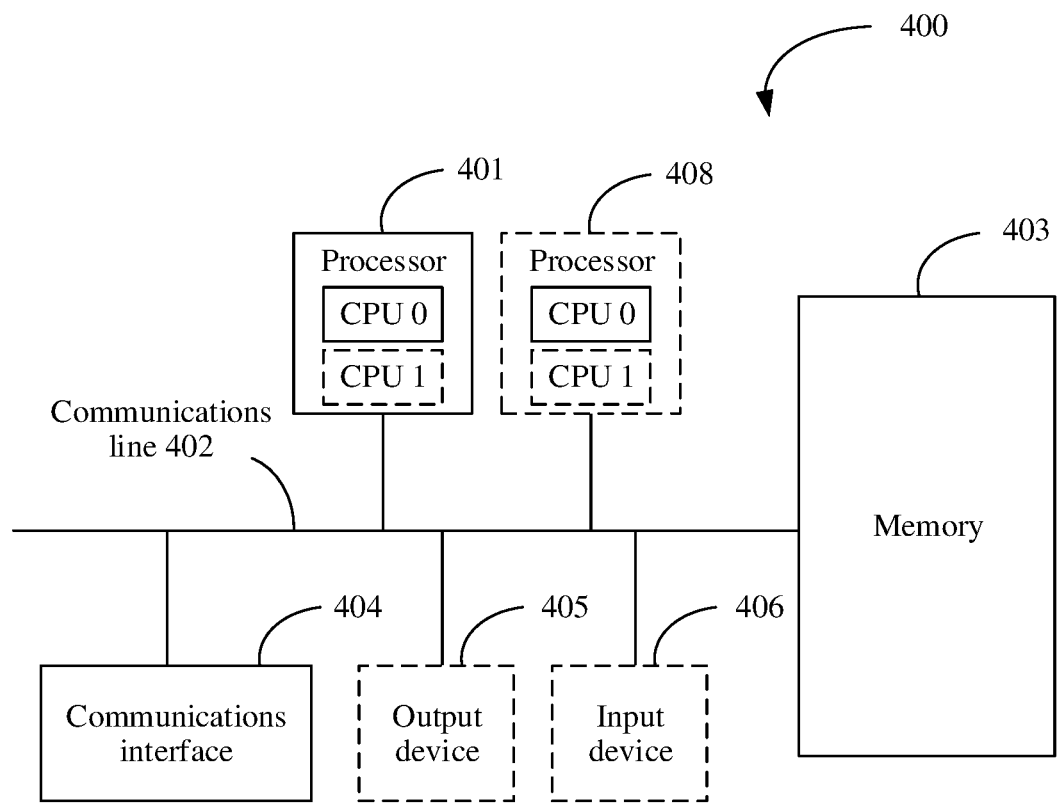
FIG. 2 is a schematic structural diagram of a communications device according to an embodiment of this application.

For example, each network element in FIG. 1 may be implemented by a communications device 400 in FIG. 2. FIG. 2 is a schematic structural diagram of hardware of the communications device according to an embodiment of this application. The communications device 400 includes at least one processor 401, a communications line 402, a memory 403, and at least one communications interface 404.

The processor 401 may be a general-purpose central processing unit (CPU), a microprocessor, an application-specific integrated circuit (ASIC), or one or more integrated circuits configured to control program execution in the solutions of this application.

The communications line 402 may include a path for transmitting information between the foregoing components.

The communications interface 404, which uses any type of apparatus such as a transceiver, is configured to communicate with another device or a communications network, such as the Ethernet, a RAN, and a wireless local area network (WLAN).

The memory 403 may be a read-only memory (ROM) or another type of static storage device capable of storing static information and instructions, a random access memory (RAM) or another type of dynamic storage device capable of storing information and instructions, or may be an electrically erasable programmable read-only memory (EEPROM), a compact disc read-only memory (CD-ROM) or another compact disc storage, an optical disc storage (including a compressed optical disc, a laser disc, an optical disc, a digital versatile disc, a Blu-ray optical disc, and the like), a magnetic disk storage medium or another magnetic storage device, or any other medium capable of carrying or storing expected program code in a form of instructions or data structures and capable of being accessed by a computer, but is not limited thereto. The memory may exist independently, and is connected to the processor by using the communications line 402. Alternatively, the memory may be integrated with the processor. The memory provided in this embodiment of this application may be usually non-volatile. The memory 403 is configured to store a computer executable instruction for performing the solutions in this application, and the processor 401 controls execution. The processor 401 is configured to execute the computer executable instruction stored in the memory 403, to implement methods provided in the following embodiments of this application.

Optionally, the computer executable instruction in this embodiment of this application may also be referred to as application program code. This is not specifically limited in this embodiment of this application.

In specific implementation, in an embodiment, the processor 401 may include one or more CPUs, for example, a CPU 0 and a CPU 1 in FIG. 2.

In specific implementation, in an embodiment, the communications device 400 may include a plurality of processors, for example, the processor 401 and a processor 408 in FIG. 2. Each of the processors may be a single-core (single-CPU) processor, or may be a multi-core (multi-CPU) processor. The processor herein may refer to one or more devices, circuits, and/or processing cores configured to process data (for example, a computer program instruction).

In specific implementation, in an embodiment, the communications device 400 may further include an output device 405 and an input device 406. The output device 405 communicates with the processor 401, and may display information in a plurality of manners. For example, the output device 405 may be a liquid crystal display (LCD), a light emitting diode (LED) display device, a cathode ray tube (CRT) display device, a projector, or the like. The input device 406 communicates with the processor 401, and may receive user input in a plurality of manners. For example, the input device 406 may be a mouse, a keyboard, a touchscreen device, a sensing device, or the like.

The communications device 400 may be a general-purpose device or a dedicated device. In specific implementation, the communications device 400 may be a desktop computer, a portable computer, a network server, a personal digital assistant (PDA), a mobile phone, a tablet computer, a wireless terminal device, an embedded device, or a device with a structure similar to that in FIG. 2. A type of the communications device 400 is not limited in this embodiment of this application.

The following describes the technical solutions provided in this application with reference to FIG. 1 and FIG. 2.

It should be noted that, for ease of description, unless otherwise described, an explanation of any term, a description of a related embodiment, and the like below are provided by using a single polarization direction as an example. Unless otherwise described, an explanation of any term, a description of a related embodiment, and the like below are provided based on an example in which a quantity of layers is 1 (that is, one spatial stream). A unified description is provided herein and details are not described below again.

The following explains and describes related terms and technologies in this application.

(1). Receive End Device and Transmit End Device

The receive end device may be the terminal 200 in FIG. 1, and the transmit end device may be the network device 100 in FIG. 1. Alternatively, the receive end device may be the network device 100 in FIG. 1, and the transmit end device may be the terminal 200 in FIG. 1. The following specific examples are all described by using an example in which the transmit end device is a network device and the receive end device is a terminal.

(2). Frequency Band

A system bandwidth (or a carrier bandwidth) may be divided into a plurality of frequency bands. A quantity of frequency bands obtained by dividing the system bandwidth is not limited in this application, in other words, a frequency-domain granularity used during division into frequency bands is not limited. For example, the frequency-domain granularity may be one or more resource blocks (RB), or may be one or more subcarriers. In addition, for an implementation of dividing the system bandwidth into a plurality of frequency bands, refer to the prior art. For example, refer to a subband in the LTE standard to understand the frequency band.

In the following, the quantity of frequency bands obtained by dividing the system bandwidth is denoted as Nre, and a quantity of frequency bands corresponding to channel information that needs to be indicated and that is indicated by the transmit end device to the receive end device is denoted as Nsb. 1≤Nsb≤Nre, and both Nre and Nsb are integers.

(3). Space-Domain Base Vector Set and Space-Domain Base Vector

The space-domain base vector set is a set of a series of space-domain base vectors. The space-domain base vector set may be usually represented in a form of a matrix. The space-domain base vector may be a column vector of the matrix. Each space-domain base vector may correspond to one transmit beam of the transmit end device. It may be understood that, weighted combination may be performed on several space-domain base vectors in the space-domain base vector set to obtain a space-domain combined vector, and the space-domain combined vector may correspond to a new transmit beam. The method for obtaining the new transmit beam through weighted combination may also be referred to as a beam combination technology. The technology has been adopted in a new radio (NR) standard as a basic technology of a high-resolution precoding (namely, type II precoding) technology.

For example, the space-domain base vector set may be, but is not limited to, a two-dimensional discrete Fourier transform (DFT) matrix or an oversampled two-dimensional DFT matrix. Specifically, the space-domain base vector may be a column vector of the two-dimensional DFT matrix or a column vector of the oversampled two-dimensional DFT matrix. In other words, the space-domain base vector may be a two-dimensional DFT vector. The two-dimensional DFT vector may be usually used to describe a beam formed by superposing a beam in a horizontal direction and a beam in a vertical direction. Apparently, this application is not limited thereto. Design manners of the space-domain base vector set have been described in detail in the prior art, and details are not described herein.

In a specific implementation process, the space-domain base vector set may be predefined by both the receive end device and the transmit end device, for example, predefined according to a protocol. Apparently, this application is not limited thereto.

It should be noted that, in the descriptions of this specification, unless otherwise specified, or unless otherwise conflicting with actual functions or internal logic of vectors in related descriptions, the vectors described in this specification may be understood as vectors of a same form, for example, a row vector or a column vector.

A quantity of dimensions of a space-domain base vector is the same as a quantity of dimensions of a precoding vector, and both are N. In other words, both a space-domain base vector and a precoding vector include N elements. N may be a quantity of transmit antenna ports of the transmit end device in one polarization direction, where N≥2, and N is an integer.

(4). Frequency-Domain Base Vector Set and Frequency-Domain Base Vector

The frequency-domain base vector set is a set of a series of frequency-domain base vectors. The frequency-domain base vector set may be usually represented in a form of a matrix. The frequency-domain base vector may be a column vector of the matrix. Each frequency-domain base vector may correspond to one frequency band variation pattern of a channel. Simply, each frequency band may be represented by an element corresponding to the frequency band in a frequency-domain base vector. In this way, elements corresponding to all frequency bands in the frequency-domain base vector can reflect one frequency band variation pattern. It may be understood that, weighted combination may be performed on several frequency-domain base vectors in the frequency-domain base vector set to obtain a frequency-domain combined vector, and the frequency-domain combined vector may correspond to a new frequency band variation pattern. For an implementation principle of the frequency-domain combined vector, refer to, for example but not limited to, the implementation principle of obtaining the space-domain combined vector by using the beam combination technology.

The frequency band variation pattern may be used to indicate a variation regularity of a channel in each frequency band in an entire frequency band including, for example, all frequency bands. A frequency band variation pattern indicates a variation regularity of a channel in all frequency bands. For example, if elements of a frequency-domain base vector or a frequency-domain combined vector are equal, the frequency-domain base vector may indicate such a frequency band variation pattern that a channel remains unchanged in all frequency bands. For example, if adjacent elements of a frequency-domain base vector are greatly different from each other, the frequency-domain base vector may indicate such a frequency band variation pattern that a channel changes greatly in all frequency bands.

For example, the frequency-domain base vector set may be, but is not limited to, one-dimensional DFT matrix, an oversampled one-dimensional DFT matrix, or a singular value decomposition (SVD) unitary matrix. Specifically, the frequency-domain base vector may be a column vector of the one-dimensional DFT matrix, a column vector of the oversampled one-dimensional DFT matrix, or a column vector of the SVD unitary matrix. For a principle of obtaining each frequency-domain base vector in the frequency-domain base vector set, refer to a principle of obtaining each space-domain base vector in a space-domain base vector set in the prior art.

It should be noted that, for example, the frequency-domain base vector set is a one-dimensional DFT matrix. A quantity of DFT points may be predefined or may be configured by the transmit end device for the receive end device, and the quantity of points may be a quantity of frequency bands. If the quantity of DFT points is configured by the transmit end device for the receive end device, the transmit end device may perform configuration in an explicit indication manner, or may perform configuration in an implicit indication manner. For example, if configuration is performed in the explicit indication manner, the transmit end device may perform configuration by using at least one of radio resource control (RRC) signaling, medium access control (MAC) signaling, and downlink control information (DCI). For example, if configuration is performed in the implicit indication manner, specifically, the quantity of DFT points may be implicitly indicated by configuring Nre or Nsb.

In an example, the frequency-domain base vector may be expressed as the following formula:

$$f_{2,j} = \begin{bmatrix} \omega_A^{0*j} \\ \omega_A^{1*j} \\ \vdots \\ \omega_A^{(A-1)*j} \end{bmatrix}$$

$f_{2,j}$ is a $j^{th}$ column vector (namely, a $j^{th}$ frequency-domain base vector) in the frequency-domain base vector set. $\omega_A = e^{-2\pi i/A}$, i is an imaginary unit, $0 \leq j \leq A-1$, and both j and A are integers. A may be Nre or Nsb. Apparently, an expression form of the frequency-domain base vector may not be limited thereto.

In a specific implementation process, the frequency-domain base vector set may be predefined by both the receive end device and the transmit end device, for example, predefined according to a protocol. Apparently, this application is not limited thereto.

A quantity of dimensions of the frequency-domain base vector is M, in other words, the vector includes M elements. M may be, for example, a quantity of frequency bands for which a precoding vector needs to be fed back, $M \geq 1$, and M is an integer.

(5). Space-Frequency Base Matrix Set and Space-Frequency Base Matrix

The space-frequency base matrix set is a set of a series of space-frequency base matrices. The space-frequency base matrix set may be represented in a form of a tensor. Apparently, this application is not limited thereto. Each element of the space-frequency base matrix set may be a space-frequency base matrix. Each space-frequency base matrix may correspond to one transmit beam and one frequency band variation pattern of the transmit end device. Weighted combination may be performed on several space-frequency base matrices in the space-frequency base matrix set, to obtain a space-frequency combined matrix. For an implementation principle of the space-frequency combined matrix, refer to, for example but not limited to, the implementation principle of obtaining the space-domain combined vector by using the beam combination technology.

A space-frequency base matrix may be constructed based on two vectors, and one of the two vectors may be constructed based on a space-domain base vector and the other one may be constructed based on a frequency-domain base vector. Specifically, one of the two vectors may be one of a space-domain base vector and a frequency-domain base vector or a transformation thereof, and the other one of the two vectors may be the other one of the space-domain base vector and the frequency-domain base vector or a transformation thereof. The foregoing transformation may be, for example but not limited to, transpose, conjugate, conjugate transpose, and the like. For example, a space-frequency base matrix may be a product of a space-domain base vector and a conjugate transpose vector of a frequency-domain base vector; may be a product of a space-domain base vector and a transposed vector of a frequency-domain base vector; may be a product of a frequency-domain base vector and a conjugate transpose vector of a space-domain base vector; or may be a product of a frequency-domain base vector and a transposed vector of a space-domain base vector. Apparently, this application is not limited thereto. In a specific implementation process, the two vectors for constructing the space-frequency base matrix may be set as a row vector and a column vector. In this case, the space-frequency base matrix may be a product of the column vector and the row vector.

For ease of description, an example in which a space-frequency base matrix may be a product of a space-domain base vector and a conjugate transpose vector of a frequency-domain base vector, or a product of a frequency-domain base vector and a conjugate transpose vector of a space-domain base vector is used for description below. However, a person skilled in the art should understand that a manner of constructing the space-frequency base matrix is not limited thereto, and the space-frequency base matrix may alternatively be constructed in another manner. The space-frequency base matrix may be constructed by using a space-domain base vector and a frequency-domain base vector in, for example but not limited to, various manners described above or other manners.

In a specific implementation process, the space-frequency base matrix set may be predefined by both the receive end device and the transmit end device, for example, predefined according to a protocol. Apparently, this application is not limited thereto.

A quantity of dimensions of the space-frequency base matrix is N×M or M×N, in other words, the matrix includes N rows and M columns, or includes M rows and N columns.

(6). Space-Frequency Base Vector Set and Space-Frequency Base Vector

The space-frequency base vector set is a set of a series of space-frequency base vectors. The space-frequency base vector set may be usually represented in a form of a matrix. The space-frequency base vector may be a column vector of the matrix. Each space-frequency base vector may correspond to one transmit beam and one frequency band variation pattern of the transmit end device. Weighted combination may be performed on several space-frequency base vectors in the space-frequency base vector set, to obtain a space-frequency combined vector. For an implementation principle of the space-frequency combined vector, refer to, for example but not limited to, the implementation principle of obtaining the space-domain combined vector by using the beam combination technology.

A space-frequency base vector may be a Kronecker product of two vectors. One of the two vectors is constructed based on a space-domain base vector, and the other one is constructed based on a frequency-domain base vector. Specifically, one of the two vectors may be the space-domain base vector or a transformation thereof, and the other one of the two vectors may be the frequency-domain base vector or a transformation thereof. The foregoing transformation may be, for example but not limited to, transpose, conjugate, conjugate transpose, and the like. For example, a space-frequency base vector may be a Kronecker product of a space-domain base vector and a frequency-domain base vector, and may be specifically expressed as the following formula: $v = u_1 \otimes u_2$. Alternatively, a space-frequency base vector may be a Kronecker product of a space-domain base vector and a conjugate vector of a frequency-domain base vector, and may be specifically expressed as the following formula: $v = u_1 \otimes \bar{u}_2$. Alternatively, a space-frequency base vector may be a Kronecker product of a conjugate vector of a space-domain base vector and a frequency-domain base vector, and may be specifically expressed as the following formula: $v=\bar{u}_1 \otimes u_2$. Alternatively, a space-frequency base vector may be a Kronecker product of a frequency-domain base vector and a space-domain base vector, and may be specifically expressed as the following formula: $v=u_2 \otimes u_1$. Alternatively, a space-frequency base vector may be a Kronecker product of a conjugate vector of a frequency-domain base vector and a space-domain base vector, and may be specifically expressed as the following formula: $v=\bar{u}_2 \otimes u_1$. Alternatively, a space-frequency base vector may be a Kronecker product of a frequency-domain base vector and a conjugate vector of a space-domain base vector, and may be specifically expressed as the following formula: $v=u_2 \otimes \bar{u}_1$. V is the space-frequency base vector. $\bar{u}_1$ is the space-domain base vector, and $u_2$ is the frequency-domain base vector. $\bar{u}_1$ is a conjugate vector of $u_1$, and $\bar{u}_2$ is a conjugate vector of $u_2$. Apparently, this application is not limited thereto.

In a specific implementation process, the two vectors for constructing the space-frequency base vector may both be set as row vectors or may both be set as column vectors. In this case, the space-frequency base vector may be a Kronecker product of the two column vectors or a Kronecker product of the two row vectors.

For ease of description, an example in which a space-frequency base vector may be a Kronecker product of a space-domain base vector and a frequency-domain base vector, or a Kronecker product of a frequency-domain base vector and a space-domain base vector is used for description below. However, a person skilled in the art should understand that a manner of constructing the space-frequency base vector is not limited thereto, and the space-frequency base vector may alternatively be constructed in another manner. The space-frequency base vector may be constructed by using a space-domain base vector and a frequency-domain base vector in, for example but not limited to, various manners described above or other manners.

In a specific implementation process, the space-frequency base vector set may be predefined by both the receive end device and the transmit end device, for example, predefined according to a protocol. Apparently, this application is not limited thereto.

A quantity of dimensions of the space-frequency base vector is M×N, in other words, the vector includes M×N elements.

(7). Space-Domain Component Vector and Space-Domain Component Vector Set

In some embodiments of this application, the space-domain component vector may be selected from the space-domain component vector set. The space-domain component vector set is a set of a series of space-domain component vectors. The space-domain component vector set may be usually represented in a form of a matrix. The space-domain component vector may be a column vector of the matrix. Each space-domain component vector may correspond to one transmit beam of the transmit end device. The method for obtaining the space-domain component vector through selection may also be referred to as a beam selection technology. The technology has been adopted in an NR standard as a basic technology of a low-resolution precoding (namely, type I precoding) technology.

In a specific implementation process, the space-domain component vector set may be predefined by both the receive end device and the transmit end device, for example, predefined according to a protocol. Apparently, this application is not limited thereto.

In some other embodiments of this application, the space-domain component vector may be generated by performing weighted combination on a plurality of space-domain base vectors selected from a space-domain base vector set, in other words, the space-domain component vector is constructed based on a plurality of space-domain base vectors by using the beam combination technology. In this case, the space-domain component vector is a space-domain combined vector.

A quantity of dimensions of the space-domain component vector is N, in other words, the vector includes N elements.

(8) Frequency-Domain Component Vector and Frequency-Domain Component Vector Set

In some embodiments of this application, the frequency-domain component vector may be selected from the frequency-domain component vector set. The frequency-domain component vector set is a set of a series of frequency-domain component vectors. The frequency-domain component vector set may be usually represented in a form of a matrix. The frequency-domain component vector may be a column vector of the matrix. Each frequency-domain component vector may correspond to one frequency band variation pattern of the transmit end device. For an implementation principle of the method for obtaining the frequency-domain component vector in the selection manner, refer to, for example but not limited to, the implementation principle of obtaining the space-domain component vector by using the beam selection technology.

In a specific implementation process, the frequency-domain component vector set may be predefined by both the receive end device and the transmit end device, for example, predefined according to a protocol. Apparently, this application is not limited thereto.

In some other embodiments of this application, the frequency-domain component vector may be generated by performing weighted combination on a plurality of frequency-domain base vectors selected from the frequency-domain base vector set. In this case, the frequency-domain component vector is a frequency-domain combined vector.

A quantity of dimensions of the frequency-domain component vector is M, in other words, the vector includes M elements.

(9). Space-Frequency Component Matrix, and Space-Frequency Component Matrix Set

In some embodiments of this application, the space-frequency component matrix may be selected from the space-frequency component matrix set. The space-frequency component matrix set is a set of a series of space-frequency component matrices. The space-frequency component matrix set may be represented in a form of a tensor. Apparently, this application is not limited thereto. Each element of the space-frequency component matrix set may be a space-frequency component matrix. Each space-frequency component matrix may correspond to one transmit beam and one frequency band variation pattern of the transmit end device. For an implementation principle of the method for obtaining the space-frequency component matrix in the selection manner, refer to, for example but not limited to, the implementation principle of obtaining the space-domain component vector by using the beam selection technology.

In some other embodiments of this application, the space-frequency component matrix may be generated by performing weighted combination on a plurality of space-frequency base matrices selected from the space-frequency base matrix set. In this case, the space-frequency component matrix is a space-frequency combined matrix.

In some other embodiments of this application, the space-frequency component matrix may be constructed based on two vectors, and the two vectors may be respectively constructed based on a space-domain component vector and a frequency-domain component vector. Specifically, one of the two vectors may be one of a space-domain component vector and a frequency-domain component vector or a transformation thereof, and the other one of the two vectors may be the other one of the space-domain component vector and the frequency-domain component vector or a transformation thereof. The foregoing transformation may be, for example but not limited to, transpose, conjugate, conjugate transpose, and the like. For example, the space-frequency component matrix may be a product of a space-domain component vector and a conjugate transpose vector of a frequency-domain component vector, a product of a space-domain component vector and a transposed vector of a frequency-domain component vector, a product of a frequency-domain component vector and a conjugate transpose vector of a space-domain component vector, or a product of a frequency-domain component vector and a transposed vector of a space-domain component vector. In a specific implementation process, the two vectors for constructing the space-frequency component matrix may be set as a row vector and a column vector. In this case, the space-frequency component matrix may be a product of the column vector and the row vector.

In the following description, an example in which the space-frequency component matrix may be a product of a space-domain component vector and a conjugate transpose vector of a frequency-domain component vector, or a product of a frequency-domain component vector and a conjugate transpose vector of a space-domain component vector is used for description. However, a person skilled in the art should understand that a manner of constructing the space-frequency component matrix is not limited thereto, and the space-frequency component matrix may alternatively be constructed in another manner. The space-frequency component matrix may be constructed by using a space-domain component vector and a frequency-domain component vector in, for example but not limited to, various manners described above or other manners.

A quantity of dimensions of the space-frequency component matrix is N×M or M×N, in other words, the matrix includes N rows and M columns, or includes M rows and N columns.

(10). Space-Frequency Component Vector and Space-Frequency Component Vector Set

In some embodiments of this application, the space-frequency component vector may be selected from the space-frequency component vector set. The space-frequency component vector set is a set of a series of space-frequency component vectors. The space-frequency component vector set may be usually represented in a form of a matrix. The space-frequency component vector may be a column vector of the matrix. Each space-frequency component vector may correspond to one transmit beam and one frequency band variation pattern of the transmit end device. For an implementation principle of the method for obtaining the space-frequency component vector in the selection manner, refer to, for example but not limited to, the implementation principle of obtaining the space-domain component vector by using the beam selection technology.

In some other embodiments of this application, the space-frequency component vector may be generated by performing weighted combination on a plurality of space-frequency base vectors selected from the space-frequency base vector set. In this case, the space-frequency component vector is a space-frequency combined vector.

In some other embodiments of this application, the space-frequency component vector may be a Kronecker product of two vectors. One of the two vectors is constructed based on a space-domain component vector, and the other one of the two vectors is constructed based on a frequency-domain component vector. Specifically, one of the two vectors may be the space-domain component vector or a transformation thereof, and the other one of the two vectors may be the frequency-domain component vector or a transformation thereof. The foregoing transformation may be, for example but not limited to, transpose, conjugate, conjugate transpose, and the like. For a specific example, refer to the example of constructing the space-frequency base vector described above.

A quantity of dimensions of the space-frequency component vector is M×N, in other words, the vector includes M×N elements.

(11). Space-Frequency Matrix in a Broad Sense

The space-frequency matrix in a broad sense is a matrix formed by M precoding vectors. Each precoding vector is applied to one of M frequency bands, where the M frequency bands may be frequency bands for which channel information (for example but not limited to a precoding vector) needs to be fed back. M≥1, and M is an integer. A precoding vector is usually used to represent channel information corresponding to a spatial stream in a frequency band. A quantity of dimensions of the precoding vector is N, and N may be a quantity of transmit antenna ports of the transmit end device in a polarization direction. N≥2, and N is an integer. The space-frequency matrix in a broad sense includes a space-frequency matrix in a narrow sense and a space-frequency vector.

The space-frequency matrix in a narrow sense is an N×M matrix (namely, a matrix of N rows and M columns) or an M×N matrix (namely, a matrix of M rows and N columns) formed by M precoding vectors. For related descriptions, refer to (12) described below.

The space-frequency vector is an M×N-dimensional vector (which includes M×N elements), that is, may be a space-frequency matrix in a broad sense whose column quantity is 1. For related descriptions, refer to (13) described below.

(12). Space-Frequency Matrix in a Narrow Sense

The space-frequency matrix in a narrow sense may be represented in a form of a weighted combination of a plurality of space-frequency component matrices. It should be noted that, for ease of description, unless otherwise described, or unless otherwise obviously conflicting with a meaning to be expressed, the space-frequency matrix in the following description is the space-frequency matrix in a narrow sense. A unified description is provided herein and details are not described below again.

For the receive end device, the space-frequency matrix may be obtained based on a channel matrix. The channel matrix may be a matrix that is obtained by the receive end device based on a reference signal sent by the transmit end device and that is used to reflect channel information. An implementation of obtaining the space-frequency matrix by the receive end device based on the channel matrix is not limited in this application. Several implementations are listed below:

In an implementation, the receive end device may obtain an ideal space-frequency matrix H' based on a channel matrix, and then approximately represent the ideal space-frequency matrix in a form of a weighted sum of a plurality of space-frequency component matrices. The weighted sum of the plurality of space-frequency component matrices is the space-frequency matrix H, and therefore, it can be learned that the space-frequency matrix H is an approximation of the ideal space-frequency matrix H'. For example, H' may be represented in the following form:

$$H' \approx H = \sum_{w=1}^{W} \hat{h}_w h_w.$$

W is a quantity of space-frequency component matrices. $h_w$ is a $w^{th}$ space-frequency component matrix. $1 \leq w \leq W$, $W \geq 2$, and both W and w are integers. $\hat{h}_w$ is a weight of $h_w$. The ideal space-frequency matrix H' may be formed by M ideal precoding vectors. For example, each ideal precoding vector may be used as a column vector of the ideal space-frequency matrix H', or a conjugate transpose vector of each ideal precoding vector is used as a row vector of the ideal space-frequency matrix H'. Each ideal precoding vector corresponds to one of M frequency bands, where $1 \leq M \leq Nsb$, and M is an integer. The ideal precoding vector may be obtained by performing eigenvalue decomposition on a channel matrix or a related matrix of the channel matrix, and is used to represent channel information corresponding to a spatial stream in a frequency band. Related descriptions of the ideal precoding vector have been described in detail in the prior art, and details are not described herein again. In addition, the ideal space-frequency matrix may also be approximately expressed as a space-frequency component matrix. In a specific implementation process, the ideal space-frequency matrix H' may be obtained in various manners. A specific manner is not limited in this embodiment of this application. For example, a precoding matrix in each of the M frequency bands may be arranged in a row direction or a column direction, to obtain an overall precoding matrix of the M frequency bands, and the precoding matrix is used as the ideal space-frequency matrix H'. For example, if a precoding matrix in each frequency band is an 8×2 matrix (whose rank (rank) is 2, that is, a quantity of transport layers is 2), for an 8×1 matrix corresponding to each transport layer, a precoding matrix in each of ten frequency bands may be arranged in a column direction, to obtain an 8×10 matrix (whose rank is 1, that is, a quantity of transport layers is 1). For another example, if a precoding matrix in each frequency band is an 8×2 matrix (whose rank is 2, that is, a quantity of transport layers is 2), for an 8×1 matrix corresponding to each transport layer, a precoding matrix in each of ten frequency bands may be arranged in a row direction, to obtain an 80×1 matrix (whose rank is 1, that is, a quantity of transport layers is 1). In addition, for technical details of determining the space-frequency component matrix and a weight thereof, refer to content of determining beam components forming a precoding vector and weights thereof in a process for determining the precoding vector based on the beam combination technology. Related content can be found in the prior art, and details are not described in this specification.

It can be understood that, if each ideal precoding vector is used as a column vector of the ideal space-frequency matrix H', the ideal space-frequency matrix H' is an N×M matrix, the space-frequency matrix H is an N×M matrix, and each space-frequency component matrix is an N×M matrix. If a conjugate transpose vector of each ideal precoding vector is used as a row vector of the ideal space-frequency matrix H', the ideal space-frequency matrix H' is an M×N matrix, the space-frequency matrix H is an M×N matrix, and each space-frequency component matrix is an M×N matrix.

In another implementation, the receive end device may preset a group of candidate weights, and the receive end device may traverse and combine each candidate space-frequency component matrix and each candidate weight, to obtain a plurality of combinations. Each combination may include one or more candidate space-frequency component matrices and a candidate weight of each of the one or more candidate space-frequency component matrices. For each combination, weighted summation may be performed on several candidate space-frequency component matrices in the combination and a candidate weight of each of the candidate space-frequency component matrices, to obtain a candidate space-frequency matrix. The candidate space-frequency matrix is an N×M matrix or an M×N matrix. The candidate space-frequency component matrix may be obtained based on any manner of obtaining a space-frequency component matrix provided above. Then, based on a plurality of candidate space-frequency matrices and channel matrices corresponding to M frequency bands, a plurality of candidate precoded channel matrices corresponding to the M frequency bands are obtained. A candidate space-frequency matrix corresponding to a candidate precoded channel matrix with a maximum channel capacity in the plurality of candidate precoded channel matrices is used as the space-frequency matrix H. A $w^{th}$ candidate space-frequency component matrix in a combination corresponding to the space-frequency matrix H may be equivalent to $h_w$, and a candidate weight of the $w^{th}$ candidate space-frequency component matrix may be equivalent to $\hat{h}_w$.

If a candidate space-frequency matrix is an N×M matrix, the obtaining, based on a plurality of candidate space-frequency matrices and channel matrices corresponding to M frequency bands, a plurality of candidate precoded channel matrices corresponding to the M frequency bands may include: using a product of a channel matrix corresponding to an $m^{th}$ frequency band in the M frequency bands and an $m^{th}$ column vector of the candidate space-frequency matrix as an $m^{th}$ column vector of the candidate precoded channel matrix, to obtain a candidate precoded channel matrix corresponding to the $m^{th}$ frequency band. After the candidate precoded channel matrix corresponding to each of the M frequency bands is calculated, a candidate precoded channel matrix corresponding to the M frequency bands can be calculated. $1 \leq m \leq M$, and m is an integer. For example, assuming that a quantity of transmit antennas is 8 and a quantity of receive antennas is 4, N=8, and the channel matrix is a 4×8 matrix. Assuming that M=10, the candidate space-frequency matrix is an 8×10 matrix. Each column of the candidate space-frequency matrix corresponds to one frequency band. For the $m^{th}$ frequency band in the M frequency bands, a 4×8 channel matrix corresponding to the $m^{th}$ frequency band in the M frequency bands may be multiplied by the $m^{th}$ column vector (that is, an 8×1-dimensional vector) in the candidate space-frequency matrix, to obtain a 4×1-dimensional vector; and then, ten 4×1-dimensional vectors corresponding to ten frequency bands form a 4×10 matrix, and the matrix is a candidate precoded channel matrix corresponding to the ten frequency bands.

If a candidate space-frequency matrix is an M×N matrix, the obtaining, based on a plurality of candidate space-frequency matrices and channel matrices corresponding to M frequency bands, a plurality of candidate precoded channel matrices corresponding to the M frequency bands may include: using a product of a channel matrix corresponding to an $m^{th}$ frequency band in the M frequency bands and an $m^{th}$ row vector of the candidate space-frequency matrix as an $m^{th}$ row vector of the candidate precoded channel matrix, to obtain a candidate precoded channel matrix corresponding to the $m^{th}$ frequency band. After the candidate precoded channel matrix corresponding to each of the M frequency bands is calculated, a candidate precoded channel matrix corresponding to the M frequency bands can be calculated.

It can be understood that the foregoing example is an example of the implementation of obtaining the space-frequency matrix H based on the channel matrix, and does not constitute a limitation on obtaining the space-frequency matrix H based on the channel matrix.

After determining the space-frequency matrix H, the receive end device may indicate related information of the space-frequency matrix H to the transmit end device. After receiving the related information, the transmit end device may determine the space-frequency matrix H based on the formula $$H = \sum_{w=1}^{W} \hat{h}_w h_w;$$

and then determine M precoding vectors based on the determined space-frequency matrix H. Each column of the space-frequency matrix H is a precoding vector, and to-be-sent data is precoded based on the M precoding vectors to send precoded data. For a specific implementation of the related information, refer to the following description.

(13). Space-Frequency Vector

For the receive end device, the space-frequency vector may be obtained based on a channel matrix. An implementation of obtaining the space-frequency vector by the receive end device based on the channel matrix is not limited in this application. Several implementations are listed below:

In an implementation, the receive end device may obtain an ideal space-frequency vector V' based on the channel matrix, and then represent the ideal space-frequency vector in a form of a weighted sum of a plurality of space-frequency component vectors. The weighted sum of the plurality of space-frequency component vectors is the space-frequency vector V, and therefore, it can be learned that the space-frequency vector V is an approximation of the ideal space-frequency vector V'. For example, V' may be approximately represented in the following form:

$$V' \approx V = \sum_{z=1}^{Z} \hat{g}_z v_z.$$

Z is a quantity of space-frequency component vectors. $V_z$ is a $z^{th}$ space-frequency component vector. $1 \leq z \leq Z$, $Z \geq 2$, and both Z and z are integers. $\hat{g}_z$ is a weight of $v_z$. The ideal space-frequency vector V' may be formed by M ideal precoding vectors. For example, the ideal space-frequency vector may be an M×N-dimensional row vector (that is, the first row vector) arranged by expanding N×M ideal space-frequency matrix row by row; may be an M×N-dimensional column vector (that is, the first column vector) arranged by expanding N×M ideal space-frequency matrix column by column; may be an M×N-dimensional column vector (that is, the second column vector) arranged by expanding M×N ideal space-frequency matrix column by column; or may be an M×N-dimensional row vector (that is, the second row vector) arranged by expanding M×N ideal space-frequency matrix row by row. It may be understood that a conjugate transpose vector of the first row vector is the second column vector. A conjugate transpose vector of the second row vector is the first column vector. In addition, the ideal space-frequency vector may also be approximately expressed as a space-frequency component vector.

In another implementation, the receive end device may preset a group of candidate weights, and the receive end device may traverse and combine each candidate space-frequency component vector and each candidate weight, to obtain a plurality of combinations. Each combination may include one or more candidate space-frequency component vectors and a candidate weight of each of the one or more candidate space-frequency component vectors. For each combination, weighted summation may be performed on several candidate space-frequency component vectors in the combination and a candidate weight of each of the candidate space-frequency component vectors, to obtain a candidate space-frequency vector. The candidate space-frequency vector is an M×N matrix. The candidate space-frequency component vector may be obtained based on any manner of obtaining a space-frequency component vector provided above. Then, based on a plurality of candidate space-frequency vectors and channel matrices corresponding to M frequency bands, a plurality of candidate precoded channel matrices corresponding to the M frequency bands are obtained. A candidate space-frequency vector corresponding to a candidate precoded channel matrix with a maximum channel capacity in the plurality of candidate precoded channel matrices is used as the space-frequency vector V. A $z^{th}$ candidate space-frequency component vector in a combination corresponding to the space-frequency vector V may be equivalent to $v_z$, and a candidate weight of the $z^{th}$ candidate space-frequency component vector may be equivalent to $\hat{g}_z$.

In an example, if the space-frequency component vector is a Kronecker product of a space-domain component vector and a frequency-domain component vector; or the space-frequency component vector is generated by performing weighted combination on a plurality of space-frequency base vectors in a space-frequency base vector set, and the space-frequency base vector is a Kronecker product of a space-domain base vector and a frequency-domain base vector, obtaining, based on each candidate space-frequency vector and channel matrices corresponding to M frequency bands, a candidate precoded channel matrix corresponding to the M frequency bands may include: using a product of a channel matrix corresponding to an $m^{th}$ frequency band in the M frequency bands and an $m^{th}$ column vector of an N×M candidate space-frequency matrix corresponding to the candidate space-frequency vector as an $m^{th}$ column vector of the candidate precoded channel matrix, to obtain a candidate precoded channel matrix corresponding to the M frequency bands. 1≤m≤M, and m is an integer. It should be noted that, in a specific implementation process, it may not be required that the candidate space-frequency vector is first converted into the N×M candidate space-frequency matrix, and then the channel matrix corresponding to the $m^{th}$ frequency band in the M frequency bands is multiplied by the $m^{th}$ column vector of the N×M candidate space-frequency matrix is not required. Alternatively, based on a location of the $m^{th}$ column vector in the candidate space-frequency vector, the $m^{th}$ column vector may be directly captured from the candidate space-frequency vector, and then, the channel matrix corresponding to the $m^{th}$ frequency band in the M frequency bands is multiplied by the $m^{th}$ column vector.

In an example, if the space-frequency component vector is a Kronecker product of a frequency-domain component vector and a space-domain component vector; or the space-frequency component vector is generated by performing weighted combination on a plurality of space-frequency base vectors in a space-frequency base vector set, and the space-frequency base vector is a Kronecker product of a frequency-domain base vector and a space-domain base vector, obtaining, based on each candidate space-frequency vector and channel matrices corresponding to M frequency bands, a candidate precoded channel matrix corresponding to the M frequency bands may include: using a product of a channel matrix corresponding to an $m^{th}$ frequency band in the M frequency bands and an $m^{th}$ row vector of an M×N candidate space-frequency matrix corresponding to the candidate space-frequency vector as an $m^{th}$ row vector of the candidate precoded channel matrix, to obtain a candidate precoded channel matrix corresponding to the M frequency bands. Related technical details may be inferred from the description above, and details are not described herein again.

It can be understood that the foregoing example is an example of the implementation of obtaining the space-frequency vector V based on the channel matrix, and does not constitute a limitation on obtaining the space-frequency vector V based on the channel matrix.

After determining the space-frequency vector V, the receive end device may indicate related information of the space-frequency vector V to the transmit end device. After receiving the related information, the transmit end device may determine the space-frequency vector V based on the formula $$V = \sum_{z=1}^{Z} \hat{g}_z v_z;$$

and then determine M precoding vectors based on the determined space-frequency vector V, precode to-be-sent data based on the M precoding vectors, for example, perform precoding by using the foregoing M precoding vectors, or adjust the foregoing M precoding vectors, and perform precoding by using M precoding vectors that are obtained through adjustment to send data that is obtained after the precoding. For a specific implementation of the related information, refer to the following description. A specific implementation of determining the M precoding vectors based on the space-frequency vector V may be understood as an inverse process of determining V.

It can be understood that if the space-frequency vector is a column vector, the space-frequency component vector is a column vector. If the space-frequency vector is a row vector, the space-frequency component vector is a row vector.

In addition, the term "a plurality of" in this application means two or more than two. The term "and/or" in this application describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects. When the character "/" is used in a formula, the character usually indicates a "division" relationship between the associated objects. For example, a formula A/B indicates that A is divided by B. In this application, the terms "first", "second", and so on are intended to distinguish between different objects but do not indicate a particular order of the objects.

It should be noted that, for ease of description, an example in which any vector (such as a space-domain base vector, a frequency-domain base vector, a space-domain component vector, a frequency-domain component vector, a space-frequency vector, a space-frequency base vector, or a precoding vector) is a column vector is used for description below. A unified description is provided herein, and details are not described below again. It may be understood that, in a specific implementation process, any vector may alternatively be a row vector. A person skilled in the art should be capable of properly inferring a corresponding technical solution when any vector is a row vector, based on the technical solution provided in this application without creative efforts. Details are not described in this specification. Further, in a specific implementation process, forms of a vector and a matrix used in this specification may be adjusted based on a specific requirement. For example, a vector and a matrix are transposed, or a vector and/or a matrix is represented in a conjugate form of the vector and/or the matrix, a combination of the foregoing forms, another form, or the like. Therefore, the foregoing inferring and adjustment should be understood as falling within the scope of the embodiments of this application.

The following describes in detail the technical solutions provided in this application with reference to the accompanying drawings.

Figure 3:
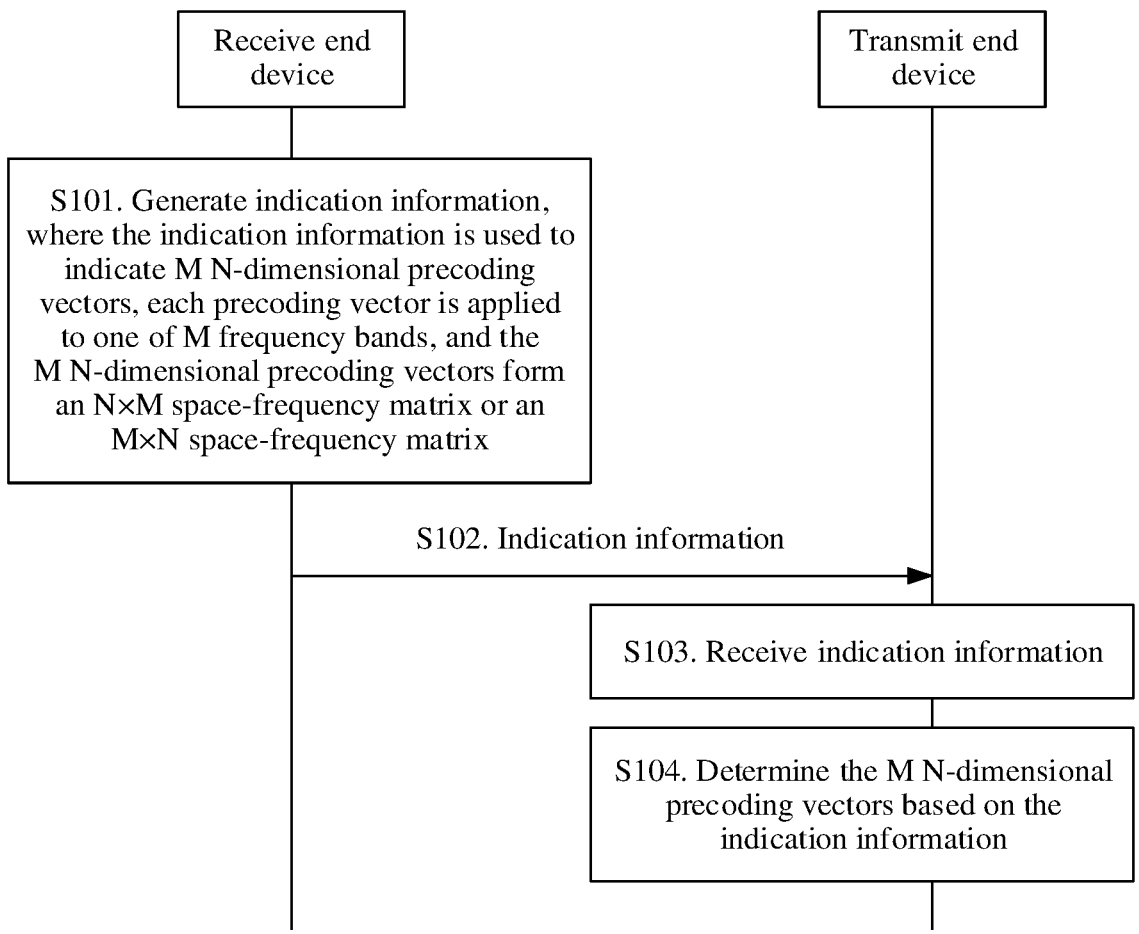
FIG. 3 is a schematic flowchart 1 of a channel estimation method according to an embodiment of this application.

FIG. 3 is a schematic flowchart of a channel estimation method according to an embodiment of this application. The method shown in FIG. 3 may include the following steps.

S101: A receive end device generates indication information, where the indication information is used to indicate M N-dimensional precoding vectors, each precoding vector is applied to one of M frequency bands, and the M N-dimensional precoding vectors form an N×M space-frequency matrix or an M×N space-frequency matrix. The space-frequency matrix is generated by performing weighted combination on a plurality of space-frequency component matrices, where M≥1, N≥2, and both M and N are integers.

The M N-dimensional precoding vectors may be precoding vectors based on which a single spatial stream is sent in each of the M frequency bands. M may be less than or equal to a quantity Nsb of frequency bands corresponding to channel information that is fed back by the receive end device, as instructed by a transmit end device.

In a specific implementation process, for a case in which a single spatial stream is transmitted in each frequency band, one or more space-frequency matrices may be designed based on an actual requirement, provided that a sum of column vectors of the one or more space-frequency matrices is equal to Nsb. For example, for a single spatial stream, precoding vectors corresponding to several continuous frequency bands may form a space-frequency matrix. For example, if a system bandwidth is divided into frequency bands 1 to 10, and the transmit end device instructs the receive end device to feed back channel information of the frequency bands 1 to 5, that is, Nsb=5, for a single spatial stream, the M precoding vectors may be precoding vectors corresponding to the frequency bands 1 to 5. In this case, M=5. For example, if a system bandwidth is divided into frequency bands 1 to 10, and the transmit end device instructs the receive end device to feed back channel information of the frequency bands 1, 2, 3, 8, and 9, that is, Nsb=5, for any spatial stream, precoding vectors corresponding to the frequency bands 1, 2, and 3 may form an N×3 or a 3×N space-frequency matrix, and precoding vectors corresponding to the frequency bands 8 and 9 may form an N×2 or a 2×N space-frequency matrix. Apparently, precoding vectors corresponding to the frequency bands 1, 2, 3, 8, and 9 may alternatively form an N×5 or a 5×N space-frequency matrix.

The space-frequency matrix is generated by performing weighted combination on a plurality of space-frequency component matrices. Therefore, the space-frequency matrix H may be expressed as the following formula:

$$H = \sum_{w=1}^{W} \hat{h}_w h_w \qquad \text{Formula 1}$$

W is a quantity of space-frequency component matrices. $h_w$ is a $w^{th}$ space-frequency component matrix. $\hat{h}_w$ is a weight of $h_w$.

For a specific implementation and the like of the indication information, refer to the following description.

S102: The receive end device sends the indication information.

Information indicated by the indication information is referred to as to-be-indicated information. In a specific implementation process, there are a plurality of manners of indicating the to-be-indicated information. The manners are, for example but not limited to, directly indicating the to-be-indicated information, for example, indicating the to-be-indicated information or an index of the to-be-indicated information. Alternatively, the to-be-indicated information may be indirectly indicated by indicating other information, and there is an association relationship between the other information and the to-be-indicated information. Alternatively, only a part of the to-be-indicated information may be indicated, and the other part of the to-be-indicated information is known or agreed on in advance. For example, specific information may be alternatively indicated based on an arrangement sequence of pieces of information agreed on in advance (for example, stipulated in a protocol), to reduce indication overheads to some extent. In addition, alternatively, a universal part of the pieces of information may be identified and indicated in a unified manner, to reduce indication overheads caused by separately indicating same information. For example, when six space-frequency component vectors are indicated, if the six space-frequency component vectors are results obtained by traversing three space-domain component vectors and two frequency-domain component vectors and calculating Kronecker products of the three space-domain component vectors and the two frequency-domain component vectors, there is no need to indicate a space-domain component vector and a frequency-domain component vector of each space-frequency component vector. Instead, the three space-domain component vectors and the two frequency-domain component vectors are indicated in a unified manner, and the six space-frequency component vectors are jointly indicated with reference to another manner, to reduce indication overheads. For another example, a person skilled in the art should understand that a precoding matrix is formed by precoding vectors, and the precoding vectors in the precoding matrix may have a same part in terms of composition or other attributes. For example, component vectors forming precoding vectors in a process of constructing the precoding vectors by using a beam combination technology may be the same. Therefore, the foregoing attribute may also be used as an attribute of the precoding matrix, and an indication of the attribute of the precoding matrix is an indication of an attribute of each precoding vector.

In addition, a specific indication manner may be various existing indication manners, for example but not limited to, the foregoing indication manners and various combinations thereof. For specific details of the various indication manners, refer to the prior art, and details are not described in this specification. It can be learned from the foregoing description that, for example, when a plurality of pieces of information of a same type need to be indicated, different information may be indicated in different manners. In a specific implementation process, a required indication manner may be selected based on a specific requirement. The selected indication manner is not limited in this embodiment of this application. In this way, the indication manner in this embodiment of this application should be understood as covering various methods by using which a to-be-indicated party can learn of to-be-indicated information.

In addition, the to-be-indicated information may have another equivalent form. For example, a row vector may be expressed as a column vector, a matrix may be represented by using a transposed matrix of the matrix, and a Kronecker product of two vectors may be represented in a form of a product of a vector and a transposed vector of another vector, and the like. The technical solution provided in this embodiment of this application should be understood as covering various forms. For example, some or all of the features in this embodiment of this application should be understood as covering various expression forms of the features. For example, a space-frequency component matrix should be understood as covering various expression forms that can represent the space-frequency component matrix. The various expression forms are, for example but not limited to, a Kronecker product of a space-domain component vector and a frequency-domain component vector, a product of one of a space-domain component vector and a frequency-domain component vector and a conjugate transpose vector of the other one of the space-domain component vector and the frequency-domain component vector, an array that includes the foregoing Kronecker product and elements in the product result, and the like.

The to-be-indicated information may be sent together as a whole, or may be divided into a plurality of pieces of sub-information and then sent separately. In addition, sending periods and/or sending occasions of the pieces of sub-information may be the same or may be different. A specific sending method is not limited in this application. The sending periods and/or sending occasions of the pieces of sub-information may be predefined, for example, predefined according to a protocol, or may be configured by the transmit end device by sending configuration information to the receive end device. The configuration information may include, for example but not limited to, one or a combination of at least two of RRC signaling, MAC signaling, and DCI.

The indication information may be a precoding vector indicator (PMI), or may be other indication information. The indication information may be carried in one or more messages in the prior art and sent by the receive end device to the transmit end device, or may be carried in one or more messages newly designed in this application and sent by the receive end device to the transmit end device.

In addition, it should be understood that the method shown in FIG. 3 is described based on a case in which a single spatial stream (for example, a data layer obtained through layer mapping) is sent in each subband in a single polarization direction. However, a person skilled in the art should understand that the technical solution provided in this embodiment of this application is not limited thereto. The technical solution provided in this embodiment of this application may be extended to a case in which a plurality of spatial streams are sent in each subband in a plurality of polarization directions. It is easy to understand that in this case, the indication information includes a related indication of a precoding vector, of each of a plurality of spatial streams, in each of the M subbands, in each of a plurality of polarization directions. It can be learned that the indication information mentioned in this embodiment of this application does not exclude the following case. That is, the indication information indicates the M N-dimensional precoding vectors as described in S101, and further indicates another one or more groups of M N-dimensional precoding vectors. These groups of M N-dimensional precoding vectors may correspond to different polarization directions, different spatial streams, or the like. In addition, the indication information includes a related indication of a precoding vector, of each of a plurality of spatial streams, in each of the M subbands, in each of a plurality of polarization directions. It should be understood that a specific indication method may be set based on a specific requirement, for example, by referring to various indication manners described above.

Simply, for the space-frequency component matrix provided in this embodiment of this application, a basic space-domain feature and a basic frequency-domain feature are combined to obtain a basic space-frequency feature. The basic space-domain feature may be understood as describing a basic spatial direction, and the basic frequency-domain feature may be understood as a variation pattern of a channel in a plurality of frequency bands. In this case, the space-frequency component matrix can be understood as describing a basic space-frequency feature. Based on this, more space-frequency features can be described by performing weighted summation on a plurality of space-frequency component matrices.

S103: The transmit end device receives the indication information.

S104: The transmit end device determines the M N dimensional precoding vectors based on the indication information.

Because the M N-dimensional precoding vectors can form a space-frequency matrix and the space-frequency matrix is generated by performing weighted combination on a plurality of space-frequency component matrices, a condition can be created for reducing indication overheads of the precoding vector. For example, the M N-dimensional precoding vectors can be indicated by indicating the space-frequency matrix. Further, the space-frequency matrix may be indicated by indicating the plurality of space-frequency component matrices. Therefore, compared with a technical solution in the prior art in which a precoding vector corresponding to each frequency band is independently indicated, the technical solution provided in this embodiment of this application helps reduce indication overheads.

The indication information in the technical solution shown in FIG. 3 is specifically described below in Embodiment 1 to Embodiment 4.

Embodiment 1

In this embodiment, M N-dimensional precoding vectors form an N×M space-frequency matrix H. Each N-dimensional precoding vector is used as a column vector of the space-frequency matrix H. The space-frequency matrix H is generated by performing weighted combination on a plurality of space-frequency component matrices. Each space-frequency component matrix is a product of a space-domain component vector and a conjugate transpose vector of a frequency-domain component vector.

Based on this, in this embodiment, the space-frequency matrix H may be expressed as the following formula:

$$H = \sum_{w=1}^{W} \hat{h}_w u_{1w} u_{2w}^*$$ Formula 2

W is a quantity of space-frequency component matrices. $u_{1w}$ is a space-domain component vector corresponding to a $w^{th}$ space-frequency component matrix. $u_{2w}$ is a frequency-domain component vector corresponding to the $w^{th}$ space-frequency component matrix, and $u^*_{2w}$ is a conjugate transpose vector of $u_{2w}$. $\hat{h}_w$ is a weight of the $w^{th}$ space-frequency component matrix $u_{1w}$, $u^*_{2w}$, and $u_{1w}u^*_{2w}$ is equivalent to $h_w$ in Formula 1.

Embodiment 2

In this embodiment, M N-dimensional precoding vectors form an M×N space-frequency matrix H. A conjugate transpose vector of each N-dimensional precoding vector is used as a row vector of the space-frequency matrix H. The space-frequency matrix H is generated by performing weighted combination on a plurality of space-frequency component matrices. Each space-frequency component matrix is a product of a frequency-domain component vector and a conjugate transpose vector of a space-domain component vector.

Based on this, in this embodiment, the space-frequency matrix H may be expressed as the following formula:

$$H = \sum_{w=1}^{W} \hat{h}_w u_{2w} u_{1w}^*$$ Formula 3

$u^*_{1w}$ is a conjugate transpose vector of $u_{1w}$. For explanations of other parameters, refer to the foregoing descriptions, and details are not described herein again.

Based on either Embodiment 1 or Embodiment 2, space-domain component vectors corresponding to different space-frequency component matrices may be the same or may be different. Frequency-domain component vectors corresponding to different space-frequency component matrices may be the same or may be different.

Optionally, the space-domain component vector is selected from a space-domain component vector set, or is generated by performing weighted combination on a plurality of space-domain base vectors selected from a space-domain base vector set.

If the space-domain component vector is generated by performing weighted combination on the plurality of space-domain base vectors selected from the space-domain base vector set, quantities of space-domain base vectors corresponding to different space-domain component vectors may be the same or may be different. Different space-domain component vectors may correspond to a same group of space-domain base vectors, or may correspond to different groups of space-domain base vectors. In other words, quantities of space-domain base vectors corresponding to different space-frequency component matrices may be the same or may be different. Different space-frequency component matrices may correspond to a same group of space-domain base vectors, or may correspond to different groups of space-domain base vectors.

In a specific implementation process, any one or more pieces of information such as: a manner selected for implementing the space-domain component vector (that is, whether the space-domain component vector is selected from the space-domain component vector set or is generated by performing weighted combination on the plurality of space-domain base vectors), whether quantities of space-domain base vectors corresponding to different space-frequency component matrices are the same, a quantity of space-frequency base vectors corresponding to each space-frequency component matrix, and whether space-domain base vectors corresponding to different space-frequency component matrices are a same group of space-domain base vectors, may be predefined, for example, predefined according to a protocol, or may be configured by the transmit end device for the receive end device. The transmit end device may configure any one or more of the foregoing information for the receive end device by using at least one of RRC signaling, MAC signaling, and DCI.

Optionally, the frequency-domain component vector is selected from a frequency-domain component vector set, or is generated by performing weighted combination on a plurality of frequency-domain base vectors selected from a frequency-domain base vector set.

If the frequency-domain component vector is generated by performing weighted combination on the plurality of frequency-domain base vectors selected from the frequency-domain base vector set, quantities of frequency-domain base vectors corresponding to different frequency-domain component vectors may be the same or may be different. Different frequency-domain component vectors may correspond to a same group of frequency-domain base vectors, or may correspond to different groups of frequency-domain base vectors. In other words, quantities of frequency-domain base vectors corresponding to different space-frequency component matrices may be the same or may be different. Different space-frequency component matrices may correspond to a same group of frequency-domain base vectors, or may correspond to different groups of frequency-domain base vectors.

In a specific implementation process, any one or more pieces of information such as: manner selected for implementing the frequency-domain component vector (that is, whether the frequency-domain component vector is selected from the frequency-domain component vector set or is generated by performing weighted combination on the plurality of frequency-domain base vectors), whether quantities of frequency-domain base vectors corresponding to different space-frequency component matrices are the same, a quantity of frequency-domain base vectors corresponding to each space-frequency component matrix, and whether frequency-domain base vectors corresponding to different space-frequency component matrices are a same group of frequency-domain base vectors, may be predefined, for example, predefined according to a protocol; or may be configured by the transmit end device for the receive end device. The transmit end device may configure any one or more of the foregoing information for the receive end device by using at least one of RRC signaling, MAC signaling, and DCI.

Based on the formula 2 or the formula 3, in a specific implementation process, for example, the space-domain component vector is generated by performing weighted combination on the plurality of space-domain base vectors selected from the space-domain base vector set, and the frequency-domain component vector is generated by performing weighted combination on the plurality of frequency-domain base vectors selected from the frequency-domain base vector set. The receive end device may determine the space-domain base vector and the frequency-domain base vector corresponding to the space-frequency matrix in, for example but not limited to, the following manners:

The above-described technical solution of first determining the ideal space-frequency matrix H' and then determining the space-frequency matrix H is used as an example. First, the ideal spatial-frequency matrix H' may be multiplied by a conjugate transpose matrix of a matrix B1 at the left, and multiplied by a matrix B2 at the right, to obtain a matrix C. B1 is a matrix formed by some or all space-domain base vectors in the space-domain base vector set. Each column of the matrix is a space-domain base vector. B2 is a matrix formed by some or all frequency-domain base vectors in the frequency-domain base vector set. Each column of the matrix is a frequency-domain base vector. Then, W elements in the matrix C are obtained, for example, first W elements that are arranged in descending order of modulus or amplitudes of all elements in the matrix C. A $w^{th}$ element in the W elements may be used as $\hat{h}_w$. It may be understood that each element in the matrix C corresponds to one space-domain base vector and one frequency-domain base vector, a space-domain base vector corresponding to the $w^{th}$ element in the W elements may be used as $u_{1w}$, and a frequency-domain base vector corresponding to the $w^{th}$ element may be used as the foregoing $u_{2w}$.

The above-described technical solution of first determining the precoded channel matrix corresponding to the M frequency bands and then determining the space-frequency matrix H is used as an example, and the weight of the $w^{th}$ space-frequency component matrix in the combination corresponding to the space-frequency matrix H may be used as $\hat{h}_w$. The space-domain base vector corresponding to the $w^{th}$ space-frequency component matrix is used as $u_{1w}$, and the frequency-domain base vector corresponding to the $w^{th}$ space-frequency component matrix is used as $u_{2w}$.

Apparently, during specific implementation, there may be another implementation. This is not limited in this application.

Optionally, to reduce indication overheads, a manner of generating a space-frequency component matrix is designed in this application. Specifically, a plurality of space-frequency component matrices share a same group of space-domain component vectors and a same group of frequency-domain component vectors. In this case:

Based on Embodiment 1, the formula 2 may be expressed as the following formula:

$$H = \sum_{k=1}^{K}\sum_{l=1}^{L} \hat{h}_{k,l} u_{1,k} u_{2,l}^* \quad \text{Formula 4}$$

$u_{1,k}$ is a $k^{th}$ space-domain component vector corresponding to the space-frequency matrix H. $u_{2,l}$ is the first frequency-domain component vector corresponding to the space-frequency matrix H. $u^*_{2,l}$ is a conjugate transpose vector of $u_{2,l}$. $\hat{h}_{k,l}$ is a weight of the (k, l)$^{th}$ space-frequency component matrix. The (k, l)$^{th}$ space-frequency component matrix is a matrix obtained by multiplying $u_{1,k}$ by $u^*_{2,l}$. $1 \le k \le K$, and $1 \le l \le L$. K is a quantity of space-domain component vectors corresponding to a space-frequency matrix H, L is a quantity of frequency-domain component vectors corresponding to the space-frequency matrix H, and k, K, l, and L are integers. In this implementation, there are K×L space-frequency component matrices.

Based on Embodiment 2, the formula 3 may be expressed as the following formula:

$$H = \sum_{k=1}^{K}\sum_{l=1}^{L} \hat{h}_{k,l} u_{2,l} u_{1,k}^* \quad \text{Formula 5}$$

$u^*_{1,k}$ is a conjugate transpose vector of $u_{1,k}$. The (k, l)$^{th}$ space-frequency component matrix is a matrix obtained by multiplying $u_{2,l}$ by $u^*_{1,k}$. For explanations of other parameters, refer to the foregoing descriptions, and details are not described herein again.

Optionally, based on the formula 4 or the formula 5, K≤N, and L≤M. If K<N and/or L<M, because related information of a precoding vector corresponding to each frequency band is independently indicated in the prior art, related information for constructing an N×M (or M×N) matrix needs to be indicated. However, in this optional implementation, only related information for constructing a K×L (or L×K) matrix needs to be indicated. Therefore, indication overheads can be reduced.

The following describes $un_{1,k}$ and $u_{2,l}$ based on the formula 4 or the formula 5:

If the space-domain component vector is selected from the space-domain component vector set, $u_{1,k}$ may be expressed as:

$u_{1,k} \in \{b_{1,p}\}_{p=1,2,\ldots P}$ $\{b_{1,p}\}_{p=1, 2, \ldots P}$ is a set formed by some or all space-domain component vectors in the space-domain component vector set. $\{b_{1,p}\}_{p=1, 2, \ldots P}$ includes P space-domain component vectors in total, and $b_{1,p}$ is a $p^{th}$ space-domain component vector in $\{b_{1,p}\}_{p=1, 2, \ldots P}$. $1 \le p \le P$, and both p and P are integers.

If the space-domain component vector is generated by performing weighted combination on the plurality of space-domain base vectors selected from the space-domain base vector set, $u_{1,k}$ may be expressed as:

$$u_{1,k} = \sum_{i=1}^{I_k} c_{1,k,i} b_{1,k,i}$$

$I_k$ is a quantity of space-domain base vectors corresponding to the space-domain component vector $u_{1,k}$ selected from the space-domain base vector set, and $b_{1,k,i}$ is an $i^{th}$ space-domain base vector in the $I_k$ space-domain base vectors. $1 \le i \le I_k$, $I_k \ge 2$, and both i and $I_k$ are integers. $c_{1,k,i}$ is a weight of $b_{1,k,i}$.

It may be understood that, if quantities of space-domain base vectors corresponding to different space-domain component vectors are the same, the formula $$u_{1,k} = \sum_{i=1}^{I_k} c_{1,k,i} b_{1,k,i}$$

may be expressed as $$u_{1,k} = \sum_{i=1}^{I} c_{1,k,i} b_{1,k,i}.$$

I is a quantity of space-domain base vectors selected from the space-domain base vector set. In this case, the receive end device may not need to indicate, to the transmit end device, a quantity of space-domain base vectors corresponding to each space-domain component vector, but may specifically indicate the quantity I of space-domain base vectors.

It may be understood that if different space-frequency component matrices correspond to a same group of space-domain base vectors, the formula $$u_{1,k} = \sum_{i=1}^{I} c_{1,k,i} b_{1,k,i}$$

may be expressed as $$u_{1,k} = \sum_{i=1}^{I} c_{1,k,i} b_{1,i}.$$

$b_{1,i}$ is an $i^{th}$ space-domain base vector in the I space-domain base vectors. In this case, the receive end device may not need to indicate, to the transmit end device, a space-domain base vector corresponding to each space-frequency component matrix, but may specifically indicate the group of space-domain base vectors.

For general representation, an example in which $$u_{1,k} = \sum_{i=1}^{I_k} c_{1,k,i} b_{1,k,i}$$

when the space-domain component vector is generated by performing weighted combination on the plurality of space-domain base vectors selected from the space-domain base vector set is used for description below.

If the frequency-domain component vector is selected from the frequency-domain component vector set, $u_{2,l}$ may be expressed as:

$u_{2,l} \in \{f_{2,q}\}_{q=1,2,\ldots Q}$ $\{f_{2,q}\}_{q=1, 2 \ldots Q}$ is a set formed by some or all frequency-domain component vectors in the frequency-domain component vector set. $\{f_{2,q}\}_{q=1, 2, \ldots Q}$ includes Q frequency-domain component vectors in total, and $f_{2,q}$ is a $q^{th}$ frequency-domain component vector in $\{f_{2,q}\}_{q=1, 2 \ldots Q}$. $1 \leq q \leq Q$, and both q and Q are integers.

If the frequency-domain component vector is generated by performing weighted combination on a plurality of frequency-domain base vectors selected from the frequency-domain base vector set, $u_{s,l}$ may be expressed as:

$$u_{2,l} = \sum_{j=1}^{J_l} c_{2,l,j} f_{2,l,j}$$

$J_l$ is a quantity of frequency-domain base vectors corresponding to the frequency-domain component vector $u_{2,l}$ selected from the frequency-domain base vector set, and $f_{2,l,j}$ is a $j^{th}$ frequency-domain base vector in the $J_l$ frequency-domain base vectors. $1 \leq j \leq J_l$, $J_l \geq 2$, and both j and $J_l$ are integers. $c_{2,l,j}$ s a weight of $f_{2,l,j}$.

It may be understood that, if different frequency-domain component vectors correspond to a same quantity of frequency-domain base vectors, the foregoing formula $$u_{2,l} = \sum_{j=1}^{J_l} c_{2,l,j} f_{2,l,j}$$

may be expressed as $$u_{2,l} = \sum_{j=1}^{J} c_{2,l,j} f_{2,l,j}.$$

J is a quantity of frequency-domain base vectors selected from the frequency-domain base vector set. In this case, the receive end device may not need to indicate, to the transmit end device, a quantity of frequency-domain base vectors corresponding to each frequency-domain component vector, but may specifically indicate the quantity J of frequency-domain base vectors.

It may be understood that if different space-frequency component matrices correspond to a same group of frequency-domain base vectors, the foregoing formula $$u_{2,l} = \sum_{j=1}^{J} c_{2,l,j} f_{2,l,j}$$

may be expressed as $$u_{2,l} = \sum_{j=1}^{J} c_{2,l,j} f_{2,j}.$$

$f_{2,j}$ is a $j^{th}$ frequency-domain base vector in the J frequency-domain base vectors. In this case, the receive end device may not need to indicate, to the transmit end device, a frequency-domain base vector corresponding to each space-frequency component matrix, but may specifically indicate the group of frequency-domain base vectors.

For general representation, an example in which $$u_{2,l} = \sum_{j=1}^{J_l} c_{2,l,j} f_{2,l,j}$$

when the frequency-domain component vector is generated by performing weighted combination on a plurality of frequency-domain base vectors selected from the frequency-domain base vector set is used for description below.

Based on the formula 4 or the formula 5, in a specific implementation process, similar to the implementation of determining the space-domain base vector and the frequency-domain base vector corresponding to the space-frequency matrix based on the formula 2 or the formula 3, elements of K rows and L columns in a matrix C are obtained, and elements of the $k^{th}$ row and the $l^{th}$ column in the elements of the K rows and L columns may be used as $\hat{h}_{k,l}$. A space-domain base vector corresponding to the elements of the $k^{th}$ row and the $l^{th}$ column in the elements of the K rows and L columns may be used as $u_{1,k}$, and a frequency-domain base vector corresponding to the elements of the $k^{th}$ row and the $l^{th}$ column may be used as $u_{2,l}$.

The following describes, based on the formula 4 or the formula 5, a specific implementation of the indication information when implementations of the space-domain component vector and the frequency-domain component vector are different.

(1). If a spatial component vector is selected from a spatial component vector set, and a frequency-domain component vector is selected from a frequency-domain component vector set, the indication information is specifically used to indicate: a spatial component vector and a frequency-domain component vector corresponding to each of a plurality of space-frequency component matrices, and a weight of the space-frequency component matrix.

In this case, with reference to the foregoing description, it can be learned that $u_{1,k}$ and $u_{2,l}$ respectively satisfy the following conditions: $u_{1,k} \in \{b_{1,p}\}_{p=1, 2, \ldots, P}$, and $u_{2,l} \in \{f_{2,q}\}_{q=1, 2 \ldots Q}$. When the space-frequency matrix H is determined based on the formula 4 or the formula 5, the indication information may be specifically used to indicate the following information: $u_{1,k} u_{2,l}$, and $\hat{h}_{k,l}$.

(2). If a spatial component vector is selected from a spatial component vector set, and a frequency-domain component vector is generated by performing weighted combination on a plurality of frequency-domain base vectors from a frequency-domain base vector set, the indication information is specifically used to indicate: a spatial component vector and a plurality of frequency-domain base vectors corresponding to each of a plurality of space-frequency component matrices, and weight information.

For example, with reference to the foregoing description, it can be learned that $u_{1,k}$ and $u_{2,l}$ respectively satisfy the following conditions: $u_{1,k} \in \{b_{1,p}\}_{p=1, 2 \ldots P}$, and $$u_{2,l} = \sum_{j=1}^{J_l} c_{2,l,j} f_{2,l,j}.$$

Based on this, the formula 4 may be expressed as the following formula 6, and the formula 5 may be expressed as the following formula 7:

$$H = \sum_{k=1}^{K}\sum_{l=1}^{L}\hat{h}_{k,l}u_{1,k}\left(\sum_{j=1}^{J_l}c_{2,l,j}f_{2,l,j}\right)^* = \sum_{k=1}^{K}\sum_{l=1}^{L}u_{1,k}\left(\sum_{j=1}^{J_l}\overline{\hat{h}}_{k,l}c_{2,l,j}f_{2,l,j}\right)^* \quad \text{Formula 6}$$

$$H = \sum_{k=1}^{K}\sum_{l=1}^{L}\hat{h}_{k,l}\left(\sum_{j=1}^{J_l}c_{2,l,j}f_{2,l,j}\right)u_{1,k}^* = \sum_{k=1}^{K}\sum_{l=1}^{L}\left(\sum_{j=1}^{J_l}\overline{\hat{h}}_{k,l}c_{2,l,j}f_{2,l,j}\right)u_{1,k}^* \quad \text{Formula 7}$$

$\overline{\hat{h}}_{k,l}$ is a conjugate of $\hat{h}_{k,l}$.

Implementation 1: The weight information may include weights of the plurality of frequency-domain base vectors and a weight of the space-frequency component matrix.

For example, when the space-frequency matrix H is determined based on the formula 4 or the formula 5, the indication information may be specifically used to indicate the following information: $u_{1,l}$, $f_{2,l,j}$ $c_{2,l,j}$ and $\hat{h}_{k,l}$.

Implementation 1: The weight information includes weights obtained by multiplying weights of the plurality of frequency-domain base vectors by a weight of the space-frequency component matrix.

It should be noted that, in a specific implementation process, based on different implementations of constructing the space-frequency component matrix, the weights obtained by separately multiplying the weights of the plurality of frequency-domain base vectors by the weight of the space-frequency component matrix may be specifically represented as: products of the weights of the plurality of frequency-domain base vectors or variants thereof and the weight of the space-frequency component matrix or a variant thereof. For example, the obtained weights may be specifically represented as: weights obtained by multiplying the weights of the plurality of frequency-domain base vectors by a conjugate of the weight of the space-frequency component matrix. For example, when the space-frequency matrix H is determined based on the formula 6 or the formula 7, the indication information may be specifically used to indicate the following information: $u_{1,k}$, $f_{2,l,j}$, and $\hat{h}_{k,l}c_{2,l,j}$. Apparently, this application is not limited thereto. In the following description, an implementation principle similar thereto can be inferred from the description above, and details are not described in the following description.

(3). If a spatial component vector is generated by performing weighted combination on a plurality of spatial base vectors from a spatial base vector set, and a frequency-domain component vector is selected from a frequency-domain component vector set, the indication information is specifically used to indicate: a frequency-domain component vector and a plurality of spatial base vectors corresponding to each of a plurality of space-frequency component matrices, and weight information.

For example, with reference to the foregoing description, it can be learned that $u_{1,k}$ and $u_{2,l}$ respectively satisfy the following conditions:

$$u_{1,k} = \sum_{i=1}^{I_k}c_{1,k,i}b_{1,k,i},$$

and $u_{2,l} \in \{f_{2,q}\}_{q=1,2,\ldots,Q}$. Based on this, the formula 4 may be expressed as the following formula 8, and the formula 5 may be expressed as the following formula 9:

$$H = \sum_{k=1}^{K}\sum_{l=1}^{L}\hat{h}_{k,l}\left(\sum_{i=1}^{I_k}c_{2,l,j}b_{1,k,i}\right)u_{2,l}^* = \sum_{k=1}^{K}\sum_{l=1}^{L}\left(\sum_{i=1}^{I_k}\overline{\hat{h}}_{k,l}c_{2,l,j}b_{1,k,i}\right)u_{2,l}^* \quad \text{Formula 8}$$

$$H = \sum_{k=1}^{K}\sum_{l=1}^{L}\hat{h}_{k,l}u_{2,l}\left(\sum_{i=1}^{I_k}c_{1,k,i}b_{1,k,i}\right)^* = \sum_{k=1}^{K}\sum_{l=1}^{L}u_{2,l}\left(\sum_{i=1}^{I_k}\overline{\hat{h}}_{k,l}c_{1,k,i}b_{1,k,i}\right)^* \quad \text{Formula 9}$$

Implementation 1: The weight information may include weights of the plurality of spatial base vectors and a weight of the space-frequency component matrix.

For example, when the space-frequency matrix H is determined based on the formula 4 or the formula 5, the indication information may be specifically used to indicate the following information: $u_{2,l}$, $b_{1,k,i}$, $c_{1,k,i}$ and $\hat{h}_{k,l}$.

Implementation 2: The weight information may include weights obtained by multiplying weights of the plurality of spatial base vectors by a weight of the space-frequency component matrix.

It should be noted that, in a specific implementation process, based on different implementations of constructing the space-frequency component matrix, weights obtained by separately multiplying the weights of the plurality of spatial base vectors by the weight of the space-frequency component matrix may be specifically represented as: products of the weights of the plurality of space-domain base vectors or transformations thereof and the weight of the space-frequency component matrix or a transformation thereof. For example, the weights may be specifically represented as: weights obtained by multiplying the weights of the plurality of spatial base vectors by a conjugate of the weight of the space-frequency component matrix. For example, when the space-frequency matrix H is determined based on the formula 8 or the formula 9, the indication information may be specifically used to indicate the following information: $u_{2,l}$, $b_{1,k,i}$, and $\hat{h}_{k,l}c_{1,k,i}$. Apparently, this application is not limited thereto. In the following description, an implementation principle similar thereto can be inferred from the description above, and details are not described in the following description.

(4). If a spatial component vector is generated by performing weighted combination on a plurality of spatial base vectors from a spatial component vector set, and a frequency-domain component vector is generated by performing weighted combination on a plurality of frequency-domain base vectors from a frequency-domain base vector set, the indication information is specifically used to indicate: a plurality of spatial base vectors and a plurality of frequency-domain base vectors corresponding to each of a plurality of space-frequency component matrices, and weight information.

For example, with reference to the foregoing description, it can be learned that $u_{1,k}$ and $u_{2,l}$ respectively satisfy the following conditions:

$$u_{1,k} = \sum_{i=1}^{I_k}c_{1,k,i}b_{1,k,i}, \text{ and } u_{2,l} = \sum_{j=1}^{J_l}c_{2,l,j}f_{2,l,j}.$$

Based on this, the formula 4 may be expressed as the following formula 10 or 11, and the formula 5 may be expressed as the following formula 12 or 13:

$$H = \sum_{k=1}^{K}\sum_{l=1}^{L}\left(\sum_{i=1}^{I_k}\hat{h}_{k,l}c_{2,l,j}b_{1,k,i}\right)\left(\sum_{j=1}^{J_l}c_{2,l,j}f_{2,l,j}\right)^* \quad \text{Formula 10}$$

-continued $$H = \sum_{k=1}^{K}\sum_{l=1}^{L}\left(\sum_{i=1}^{I_k} c_{1,k,i} b_{1,k,i}\right)\left(\sum_{j=1}^{J_l} \bar{h}_{k,l} c_{2,l,j} f_{2,l,j}\right)^*$$  Formula 11

$$H = \sum_{k=1}^{K}\sum_{l=1}^{L}\left(\sum_{j=1}^{J_l} c_{2,l,j} f_{2,l,j}\right)\left(\sum_{i=1}^{I_k} \bar{h}_{k,l} c_{1,k,i} b_{1,k,i}\right)^*$$  Formula 12

$$H = \sum_{k=1}^{K}\sum_{l=1}^{L}\left(\sum_{j=1}^{J_l} \hat{h}_{k,l} c_{2,l,j} f_{2,l,j}\right)\left(\sum_{i=1}^{I_k} c_{1,k,i} b_{1,k,i}\right)^*$$  Formula 13

Implementation 1: The weight information may include weights of the plurality of spatial base vectors, weights of the plurality of frequency-domain base vectors, and a weight of the space-frequency component matrix.

For example, when the space-frequency matrix H is determined based on the formula 4 or the formula 5, the indication information may be specifically used to indicate the following information: $b_{1,k,i}$, $f_{2,l,j}$, $c_{1,k,i}$, $c_{2,l,j}$, and $\hat{h}_{k,l}$.

Implementation 2: The weight information includes weights obtained by multiplying weights of the plurality of spatial base vectors by a weight of the space-frequency component matrix, and weights of the plurality of frequency-domain base vectors.

For example, when the space-frequency matrix H is determined based on the formula 10 or the formula 12, the indication information may be specifically used to indicate the following information: $b_{1,k,i}$, $f_{2,l,j}$, $\hat{h}_{k,l} c_{1,k,i}$ and $c_{2,l,j}$.

Implementation 3: The weight information may include weights obtained by multiplying weights of the plurality of frequency-domain base vectors by a weight of the space-frequency component matrix, and weights of the plurality of spatial base vectors.

For example, when the space-frequency matrix H is determined based on the formula 11 or the formula 13, the indication information may be specifically used to indicate the following information: $b_{1,k,i}$, $f_{2,l,j}$, $\hat{h}_{k,l} c_{2,l,j}$ and $c_{1,k,i}$.

It should be noted that, in a specific implementation process, after determining an ideal space-frequency matrix, the transmit end device may approximate the ideal space-frequency matrix to any one of the formulas (including any one of the formulas 2 to formula 13), and therefore, related information in the formula is indicated to the receive end device by using the indication information. The receive end device may obtain the space-frequency matrix based on the formula. In addition, it is easy to understand that the space-frequency matrix may be obtained in another manner.

Embodiment 3

In this embodiment, M N-dimensional precoding vectors form an N×M space-frequency matrix H. Each N-dimensional precoding vector is used as a column vector of the space-frequency matrix H. The space-frequency matrix H is generated by performing weighted combination on a plurality of space-frequency component matrices. Each space-frequency component matrix is selected from a space-frequency component matrix set, or is generated by performing weighted combination on a plurality of space-frequency base matrices selected from a space-frequency base matrix set. In this embodiment, the space-frequency base matrix is an N×M matrix. Each space-frequency base vector or each space-frequency component matrix in the space-frequency component matrix set may be a product of a space-domain base vector and a conjugate transpose vector of a frequency-domain base vector.

Embodiment 4

In this embodiment, M N-dimensional precoding vectors form an M×N space-frequency matrix H. Each N-dimensional precoding vector is used as a row vector of a space-frequency matrix H. The space-frequency matrix H is generated by performing weighted combination on a plurality of space-frequency component matrices. Each space-frequency component matrix is selected from a space-frequency component matrix set, or is generated by performing weighted combination on a plurality of space-frequency base matrices selected from a space-frequency base matrix set. In this embodiment, the space-frequency base matrix is an M×N matrix. Each space-frequency base vector or each space-frequency component matrix in the space-frequency component matrix set may be a product of a space-domain base vector and a conjugate transpose vector of a frequency-domain base vector.

Based on Embodiment 3 or Embodiment 4, an example in which the space-frequency component matrix is generated by performing weighted combination on a plurality of space-frequency base matrices selected from a space-frequency base matrix is used set. In a specific implementation process, the receive end device may determine the space-frequency base matrix corresponding to the space-frequency matrix in, for example but not limited to, the following manner:

The above-described technical solution of first determining an ideal space-frequency matrix H' and then determining the space-frequency matrix H is used as an example. First, the ideal space-frequency matrix H' may be expanded column by column, to obtain a column vector, and each space-frequency base matrix is expanded column by column, to obtain a column vector; then, an inner product of the column vector obtained by expanding, column by column, each space-frequency base matrix in some or all space-frequency base matrices in the space-frequency base matrix set and the column vector obtained by expanding the ideal space-frequency matrix H' column by column is calculated, to obtain a plurality of inner products; W inner products of the plurality inner products, for example, first W inner products obtained after the plurality of inner products are arranged in descending order, are obtained; and space-frequency base matrices corresponding to the W inner products are used as W space-frequency base matrices corresponding to the space-frequency matrix H.

The above-described technical solution of first determining the precoded channel matrix corresponding to the M frequency bands and then determining the space-frequency matrix H is used as an example, and the weight of the $w^{th}$ space-frequency component matrix in the combination corresponding to the space-frequency matrix H may be used as the $\hat{h}_w$. The space-frequency base matrix corresponding to the $w^{th}$ space-frequency component matrix is used as $h_w$.

Apparently, during specific implementation, there may be another implementation. This is not limited in this application.

Based on Embodiment 3 or Embodiment 4, if a space-frequency component matrix is selected from a space-frequency component matrix set, the indication information is specifically used to indicate: a plurality of space-frequency component matrices and a weight of each of the plurality of space-frequency component matrices.

Based on Embodiment 3 or Embodiment 4, if the space-frequency component matrix is generated by performing weighted combination on the plurality of space-frequency base matrices selected from the space-frequency base matrix set, the indication information may be specifically used to indicate: the plurality of space-frequency component matrices, a plurality of space-frequency base matrices corresponding to each of the plurality of space-frequency component matrices, and weight information. The weight information may include: weights of the plurality of space-frequency base matrices and a weight of the space-frequency component matrix. Alternatively, the weight information includes weights obtained by multiplying weights of the plurality of space-frequency base matrices by a weight of the space-frequency component matrix.

Formula descriptions and specific examples of the technical solutions provided in Embodiment 3 or Embodiment 4 may be inferred from the formulas provided above, and details are not described herein again.

Figure 4:
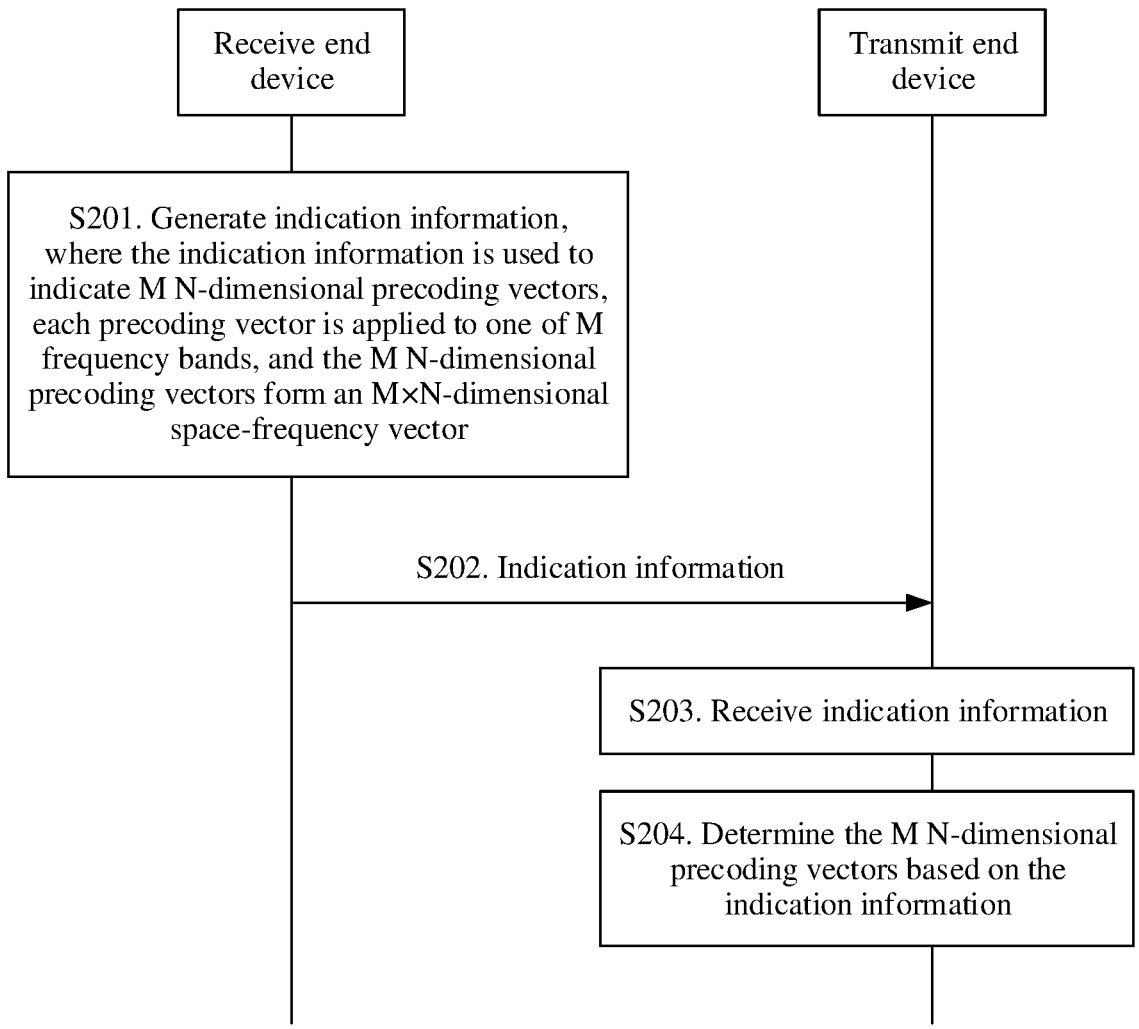
FIG. 4 is a schematic flowchart 2 of a channel estimation method according to an embodiment of this application.

FIG. 4 is a schematic flowchart of another channel estimation method according to an embodiment of this application. The method shown in FIG. 4 may include the following steps.

S201: A receive end device generates indication information, where the indication information is used to indicate M N-dimensional precoding vectors, each precoding vector is applied to one of M frequency bands, and the M N-dimensional precoding vectors form one M×N-dimensional space-frequency vector. The space-frequency vector is generated by performing weighted combination on a plurality of space-frequency component vectors, where M≥1, N≥2, and M and N are integers.

For an implementation of obtaining the M×N-dimensional space-frequency vector by the receive end device, refer to the foregoing description, and details are not described herein again.

It may be understood that, in a form, the M×N-dimensional space-frequency vector may be equivalent to an M×N-dimensional row vector obtained by expanding the N×M space-frequency matrix row by row; may be equivalent to an M×N-dimensional column vector obtained by expanding the N×M space-frequency matrix column by column; Alternatively, the M×N-dimensional space-frequency vector may be equivalent to an M×N-dimensional column vector obtained by expanding the M×N space-frequency matrix column by column. Alternatively, the M×N-dimensional space-frequency vector may be equivalent to an M×N-dimensional row vector obtained by expanding the M×N space-frequency matrix row by row. Apparently, this application is not limited thereto.

The space-frequency vector is generated by performing weighted combination on a plurality of space-frequency component vectors. Therefore, the space-frequency vector V may be expressed as the following formula:

$$V = \sum_{z=1}^{Z} \hat{g}_z v_z \qquad \text{Formula 14}$$

Z is a quantity of space-frequency component vectors. $V_z$ is a $z^{th}$ space-frequency component vector. $\hat{g}_z$ is a weight of $V_z$.

For a specific implementation and the like of the indication information, refer to the following description.

S202: The receive end device sends the indication information.

S203: A transmit end device receives the indication information.

S204: The transmit end device determines the M N-dimensional precoding vectors based on the indication information.

For explanations of related content and descriptions of beneficial effects in this embodiment, refer to the foregoing description. Details are not described herein again.

The indication information in the technical solution shown in FIG. 4 is specifically described below in Embodiment 5 to Embodiment 7.

Embodiment 5

In this embodiment, each space-frequency component vector is a Kronecker product of a spatial component vector and a frequency-domain component vector.

Based on this, in this embodiment, the space-frequency vector V may be expressed as the following formula:

$$V = \sum_{z=1}^{Z} \hat{g}_z (u_{1z} \otimes u_{2z}) \qquad \text{Formula 15}$$

Z is a quantity of space-frequency component vectors. $u_{1z}$ is a spatial component vector corresponding to a $z^{th}$ space-frequency component vector. $u_{2z}$ is a frequency-domain component vector corresponding to the $z^{th}$ space-frequency component vector, $\hat{g}_z$ is a weight of the $z^{th}$ space-frequency component vector, and the $z^{th}$ space-frequency component vector is a Kronecker product of $u_{1z}$ and $u_{2z}$, $u_{1z} \otimes u_{2z}$ is equivalent to $V_z$ in the formula 14.

Embodiment 6

In this embodiment, each space-frequency component vector is a Kronecker product of a frequency-domain component vector and a spatial component vector.

Based on this, in this embodiment, the space-frequency vector V may be expressed as the following formula:

$$V = \sum_{z=1}^{Z} \hat{g}_z (u_{2z} \otimes u_{1z}) \qquad \text{Formula 16}$$

A $z^{th}$ space-frequency component vector is a Kronecker product of $u_{2z}$ and $u_{1z}$. $u_{2z} \otimes u_{1z}$ is equivalent to V, in the formula 14. For explanations of other parameters, refer to the foregoing descriptions, and details are not described herein again.

Based on either Embodiment 5 or Embodiment 6, spatial component vectors corresponding to different space-frequency component vectors may be the same or may be different. Frequency-domain component vectors corresponding to different space-frequency component vectors may be the same or may be different.

For related descriptions of the space-domain component vector and the frequency-domain component vector, refer to the foregoing description, and details are not described herein again.

Optionally, to reduce indication overheads, a manner of generating a space-frequency component vector is designed in this application. Specifically, a plurality of space-frequency component vectors share a same group of spatial component vectors and a same group of frequency-domain component vectors. In this case:

Based on Embodiment 5, the formula 15 may be expressed as the following formula:

$$V = \sum_{c=1}^{C}\sum_{d=1}^{D} \hat{g}_{c,d}(u_{1,c} \otimes u_{2,d}) \quad \text{Formula 17}$$

$u_{1,c}$ is a $c^{th}$ space-domain component vector corresponding to the space-frequency vector V. $u_{2,d}$ is a $d^{th}$ frequency-domain component vector corresponding to the space-frequency vector V. $\hat{g}_{c,d}$ is a weight of the (c, d)$^{th}$ space-frequency component vector. The (c, d)$^{th}$ space-frequency component vector is a Kronecker product of $u_{1,c}$ and $u_{2,d}$. $1 \leq c \leq C$, and $1 \leq d \leq D$. C is a quantity of space-domain component vectors corresponding to the space-frequency vector V, D is a quantity of frequency-domain component vectors corresponding to the space-frequency vector V, and c, C, d, and D are all integers. In this implementation, there are C×D space-frequency component vectors.

Based on Embodiment 6, the formula 16 may be expressed as the following formula:

$$V = \sum_{c=1}^{C}\sum_{d=1}^{D} \hat{g}_{c,d}(u_{2,d} \otimes u_{1,c}) \quad \text{Formula 18}$$

The (c, d)$^{th}$ space-frequency component vector is a Kronecker product of $u_{2,d}$ and $u_{1,c}$. For explanations of other parameters, refer to the foregoing descriptions, and details are not described herein again.

Optionally, based on the formula 17 or 18, C≤N, and D≤M. If C<N and/or D<M, because related information of a precoding vector corresponding to each frequency band is independently indicated in the prior art, related information for constructing an N×M (or M×N) matrix needs to be indicated. However, in this optional implementation, related information for constructing only a C×D-dimensional vector needs to be indicated. Therefore, indication overheads can be reduced.

For a manner of obtaining the space-domain component vector and the frequency-domain component vector, a corresponding formula representation form in each obtaining manner, and the like, refer to the foregoing description, and details are not described herein again.

The following describes a specific implementation of the indication information when implementations of the spatial component vector and the frequency-domain component vector are different.

(1). If a spatial component vector is selected from a spatial component vector set, and a frequency-domain component vector is selected from a frequency-domain component vector set, the indication information is specifically used to indicate: a spatial component vector and a frequency-domain component vector corresponding to each of a plurality of space-frequency component vectors, and a weight of the space-frequency component vector.

(2). If a spatial component vector is selected from a spatial component vector set, and a frequency-domain component vector is generated by performing weighted combination on a plurality of frequency-domain base vectors from a frequency-domain base vector set, the indication information is specifically used to indicate: a spatial component vector and a plurality of frequency-domain base vectors corresponding to each of a plurality of space-frequency component vectors, and weight information. The weight information may include weights of the plurality of frequency-domain base vectors and a weight of the space-frequency component vector. Alternatively, the weight information may include weights obtained by multiplying weights of the plurality of frequency-domain base vectors by a weight of the space-frequency component vector.

(3). If a spatial component vector is generated by performing weighted combination on a plurality of spatial base vectors from a spatial base vector set, and a frequency-domain component vector is selected from a frequency-domain component vector set, the indication information is specifically used to indicate: a frequency-domain component vector and a plurality of spatial base vectors corresponding to each of a plurality of space-frequency component vectors, and weight information. The weight information may include weights of the plurality of spatial base vectors and a weight of the space-frequency component vector. Alternatively, the weight information may include weights obtained by multiplying weights of the plurality of spatial base vectors by a weight of the space-frequency component vector.

(4). If the spatial component vector is generated by performing weighted combination on a plurality of spatial base vectors from a spatial component vector set, and a frequency-domain component vector is generated by performing weighted combination on a plurality of frequency-domain base vectors from a frequency-domain base vector set, the indication information is specifically used to indicate: a plurality of spatial base vectors and a plurality of frequency-domain base vectors corresponding to each of a plurality of space-frequency component vectors, and weight information. The weight information may include weights of the plurality of spatial base vectors, weights of the plurality of frequency-domain base vectors, and a weight of the space-frequency component vector. Alternatively, the weight information may include weights obtained by multiplying weights of the plurality of spatial base vectors by a weight of the space-frequency component vector, and weights of the plurality of frequency-domain base vectors. Alternatively, the weight information may include weights obtained by multiplying weights of the plurality of frequency-domain base vectors by a weight of the space-frequency component vector, and weights of the plurality of spatial base vectors.

Embodiment 7

In this embodiment, each space-frequency component vector is selected from a space-frequency component vector set, or is generated by performing weighted combination on a plurality of space-frequency base vector selected from a space-frequency base vector set.

In this embodiment, a space-frequency base vector may be a Kronecker product of a space-domain base vector and a frequency-domain base vector. Alternatively, a space-frequency base vector may be a Kronecker product of a frequency-domain base vector and a spatial base vector.

If the space-frequency component vector is selected from the space-frequency component vector set, the indication information may be specifically used to indicate: the plurality of space-frequency component vectors and a weight of each of the plurality of space-frequency component vectors.

If the space-frequency component vector is generated by performing weighted combination on the plurality of space-frequency base vectors selected from the space-frequency base vector set, the indication information may be specifically used to indicate: a plurality of space-frequency base vectors corresponding to each of the plurality of space-frequency component vectors, and weight information. The weight information may include: weights of the plurality of space-frequency base vectors and a weight of the space-frequency component vector. Alternatively, the weight information includes weights obtained by multiplying weights of the plurality of space-frequency base vectors by a weight of the space-frequency component vector.

Formula descriptions and specific examples of the technical solutions provided in Embodiment 7 may be deduced from the formulas provided in the foregoing specification, and details are not described herein again.

In any implementation of Embodiment 5 or Embodiment 6, for how the receive end device determines the space-domain base vector and the frequency-domain base vector, or in any implementation of Embodiment 7, for how the receive end device determines the space-frequency base vector, refer to the corresponding technical solutions in Embodiment 1 to Embodiment 4, and details are not described herein.

Based on any implementation of any one of the foregoing embodiments, the indication information may include at least two pieces of sub-information. Each piece of sub-information may be used to indicate one or more pieces of information indicated by the indication information.

It should be noted that the foregoing describes specific information specifically indicated by the indication information. This application imposes no limitation on specific information of the indication information.

For example, sub-information used to indicate a space-domain base vector (or a frequency-domain base vector, a space-frequency base matrix, a space-frequency base vector, a space-domain component vector, a frequency-domain component vector, a space-frequency component matrix, or a space-frequency component vector) may be an index of the space-domain base vector (or the frequency-domain base vector, the space-frequency base matrix, the space-frequency base vector, the space-domain component vector, the frequency-domain component vector, the space-frequency component matrix, or the space-frequency component vector). For example, the index of the space-domain base vector may be a number of the space-domain base vector, for example, k or c.

For example, indication information used to indicate a plurality of weights of a same type may be the plurality of weights of the same type, or indexes of the plurality of weights of the same type. In addition, in some implementations, the receive end device may obtain a weight after normalizing the plurality of weights. In this case, the indication information may be further used to indicate a matrix/vector corresponding to a weight used as a normalized reference. In this case, the indication information may not carry the weight used as the normalized reference. The weight of the same type may be a weight of a space-domain base vector, a weight of a frequency-domain base vector, a weight of a space-frequency base matrix, a weight of a space-frequency base vector, a weight of a space-frequency component matrix, a weight of a space-frequency component vector, or a weight of a new type that is obtained by multiplying weights of any two types together. For example, if the weight of this the type is a weight of a space-frequency component matrix, the indication information may be used to indicate a space-frequency component matrix used as a normalized reference. For example, a number of a space-domain base vector and a weight of a frequency-domain base vector that correspond to a space-frequency component matrix may be used to indicate the space-frequency component matrix.

It may be understood that in a specific implementation process, weights of different types, for example, a weight of a space-domain base vector, a weight of a frequency-domain base vector, and a weight of a space-frequency component matrix, may be selected from a same group of candidate weights, or may be selected from different groups of candidate weights. This is not limited in this application. The candidate weight may be predefined by both the receive end device and the transmit end device, for example, predefined according to a protocol.

It should be noted that sending periods of different sub-information may be the same, or may be different.

If a sending period of sub-information indicating a space-domain base vector (or a space-domain component vector) is denoted as a first period, a sending period of sub-information indicating a frequency-domain base vector (or a frequency-domain component vector) is denoted as a second period, and a sending period of sub-information indicating a weight of a space-frequency component matrix is denoted as a third period, the first period may be greater than, less than, or equal to the second period. The third period is greater than or equal to the first period, and a fourth period is greater than or equal to the second period.

If a sending period of sub-information indicating a weight of the space-domain base vector is denoted as the fourth period, the fourth period may be less than or equal to the first period, and the fourth period may be greater than or equal to the third period. It may be understood that, if the fourth period is the same as the third period, in an implementation, even if the space-domain component vector indicated by the transmit end device to the receive end device is generated by performing weighted combination on a plurality of base vectors selected from a space-domain base vector set, the receive end device may indicate a value obtained by multiplying the weight of the space-domain base vector by the weight of the space-frequency component matrix.

If a sending period of sub-information indicating a weight of the frequency-domain base vector is denoted as a fifth period, the fifth period may be less than or equal to the second period. The fifth period may be greater than or equal to the third period, and the fourth period may be greater than, less than, or equal to the fifth period. It may be understood that, if the fifth period is the same as the third period, in an implementation, even if a frequency-domain component vector indicated by the transmit end device to the receive end device is generated by performing weighted combination on a plurality of base vectors selected from a frequency-domain base vector set, the receive end device may make an indication by multiplying the weight of the frequency-domain base vector by the weight of the space-frequency component matrix.

If a sending period of sub-information indicating a space-frequency base matrix (or a space-frequency component matrix) is denoted as a sixth period, a sending period of sub-information indicating a weight of the space-frequency base matrix is denoted as a seventh period, where the sending period of the sub-information indicating the weight of the space-frequency component matrix is the third period, the sixth period may be greater than or equal to the seventh period, the sixth period is greater than or equal to the third period, and the seventh period is greater than or equal to the third period.

If a sending period of sub-information indicating a weight of a space-frequency component vector is denoted as an eighth period, the eighth period may be less than or equal to a minimum value of the first period and the second period, the fourth period may be less than or equal to the first period, the fourth period may be greater than or equal to the eighth period, and the fifth period may be greater than or equal to the eighth period. It may be understood that, if the fourth period is the same as the eighth period, in an implementation, even if the space-domain component vector indicated by the transmit end device to the receive end device is generated by performing weighted combination on the plurality of base vectors selected from the space-domain base vector set, the receive end device may indicate a value obtained by multiplying the weight of the space-domain base vector by the weight of the space-frequency component vector. Similarly, if the fifth period is the same as the eighth period, in an implementation, even if the frequency-domain component vector indicated by the transmit end device to the receive end device is generated by performing weighted combination on the plurality of base vectors selected from the frequency-domain base vector set, the receive end device may indicate a value obtained by multiplying the weight of the frequency-domain base vector by the weight of the space-frequency component vector.

If a sending period of sub-information indicating a space-frequency base vector is denoted as a ninth period, and a sending period of sub-information indicating a weight of the space-frequency base vector is denoted as a tenth period, the ninth period may be greater than or equal to the tenth period, the ninth period is greater than or equal to the eighth period, and the tenth period is greater than or equal to the eighth period.

Any one of the first period to the tenth period may be configured by the transmit end device for the receive end device through signaling (for example, RRC signaling, MAC signaling, or DCI), or may be predefined, for example, predefined according to a protocol.

It should be noted that when the indication information indicates the weights of the plurality of space-frequency component matrices (or the space-frequency component vectors), the indication information may indicate only non-zero weights. In this case, the indication information may be further used to indicate a space-frequency component matrix (or a space-frequency component vector) corresponding to the non-zero weights. In addition, when the indication information indicates the weights obtained by multiplying the weights of the plurality of space-frequency component matrices (or the space-frequency component vectors) by the weight of the space-domain base vector (or the frequency-domain base vector), the indication information may indicate only non-zero weights obtained through multiplication. In this case, the indication information may be further used to indicate the space-frequency component matrix (or the space-frequency component vector) and/or the space-domain base vector (or the frequency-domain base vector).

A single polarization direction and one spatial stream are used as an example for description above. When this application is applied to a multi-polarization direction scenario, the indication information may be further used to indicate M N-dimensional precoding vectors in one or more other polarization directions. When this application is applied to a plurality of spatial streams, the indication information may be further used to indicate M N-dimensional precoding vectors of one or more other spatial streams. The following provides several implementations in which this application is applied to a multi-polarization direction scenario and/or a scenario of a plurality of spatial streams.

Optionally, different polarization directions and/or spatial streams may correspond to a same group of space-frequency component matrices (or space-frequency component vectors, space-domain base vectors, frequency-domain base vectors, space-frequency base matrices, or space-frequency base vectors). In this case, the receive end device may not need to indicate a group of space-frequency component matrices (or space-frequency component vectors, space-domain base vectors, frequency-domain base vectors, space-frequency base matrices, or space-frequency base vectors) for each polarization direction and/or spatial stream. In this way, indication overheads can be reduced. Apparently, different polarization directions and/or spatial streams may alternatively correspond to different groups of space-frequency component matrices (or space-domain component vectors, frequency-domain component vectors, frequency-domain base vectors, space-frequency base matrices, or space-frequency base vectors).

In addition, when this application is applied to a plurality of spatial streams, to reduce overheads, this application provides the following technical solutions. It should be noted that, in the following optional manners, the space-frequency matrix is a space-frequency matrix in a broad sense.

Optionally, quantities of frequency-domain component vectors (or space-domain component vectors, space-frequency component matrices, space-frequency component vectors, frequency-domain base vectors, space-domain base vectors, or space-frequency base vectors) corresponding to space-frequency matrices of different spatial streams are the same. For example, based on the formula 4 or the formula 5, if a wideband including M frequency bands corresponds to three spatial streams, which are respectively denoted as spatial streams 1, 2, and 3, a value K corresponding to space-frequency matrices of the spatial streams 1, 2, and 3 are all 4.

Further, optionally, a larger quantity of spatial streams indicates a smaller quantity of frequency-domain component vectors (or spatial component vectors, space-frequency component matrices, space-frequency component vectors, frequency-domain base vectors, spatial base vectors, or space-frequency base vectors) corresponding to a space-frequency matrix. For example, based on the formula 4 or formula 5, if a wideband including M frequency bands corresponds to three spatial streams, which are respectively denoted as spatial streams 1, 2, and 3, a value K corresponding to space-frequency matrices of the spatial streams 1, 2, and 3 are all 4. If a wideband including M frequency bands corresponds to four spatial streams, which are respectively denoted as spatial streams 1, 2, 3, and 4, a value K corresponding to the spatial streams 1, 2, 3, and 4 are all 2.

Optionally, a larger number of a spatial stream indicates a smaller quantity of frequency-domain component vectors (or spatial component vectors, space-frequency component matrices, space-frequency component vectors, frequency-domain base vectors, spatial base vectors, or space-frequency base vectors) corresponding to a space-frequency matrix of the spatial stream. A smaller sequence number of a spatial stream indicates better channel quality corresponding to the spatial stream. For example, if a wideband including M frequency bands corresponds to three spatial streams, which are respectively denoted as spatial streams 1, 2, and 3, a value K corresponding to the spatial stream 1 is 6, a value K corresponding to the spatial stream 2 is 4, and a value K corresponding to the spatial stream 3 is 2.

Optionally, for different spatial streams, a space-domain base vector (or a frequency-domain base vector, a space-frequency base matrix, or a space-frequency base vector) corresponding to a non-first spatial stream is selected from several space-domain base vectors (or frequency-domain base vectors, space-frequency base matrices, or space-frequency base vectors) corresponding to the first spatial stream. In this case, an index of the space-domain base vector (or the frequency-domain base vector, the space-frequency base matrix, or the space-frequency base vector) corresponding to the non-first spatial stream may be a relative index of several space-domain base vectors (or frequency-domain base vectors, space-frequency base matrices, or space-frequency base vectors) corresponding to the first spatial stream.

The foregoing mainly describes the solutions provided in the embodiments of this application from a perspective of the methods. To implement the foregoing functions, corresponding hardware structures and/or software modules for performing the functions are included. A person of ordinary skill in the art should easily be aware that, in combination with the examples of units and algorithm steps described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the channel estimation apparatus (including the receive end device or the transmit end device) may be divided into functional modules according to the method examples. For example, the functional modules may be obtained through division corresponding to each function, or two or more functions may be integrated into one processing module. The integrated module may be implemented in a form of hardware, or may be implemented in a form of a software functional module. It should be noted that, in this embodiment of this application, module division is used as an example, and is merely a logical function division. In actual implementation, another division manner may be used.

Figure 5:
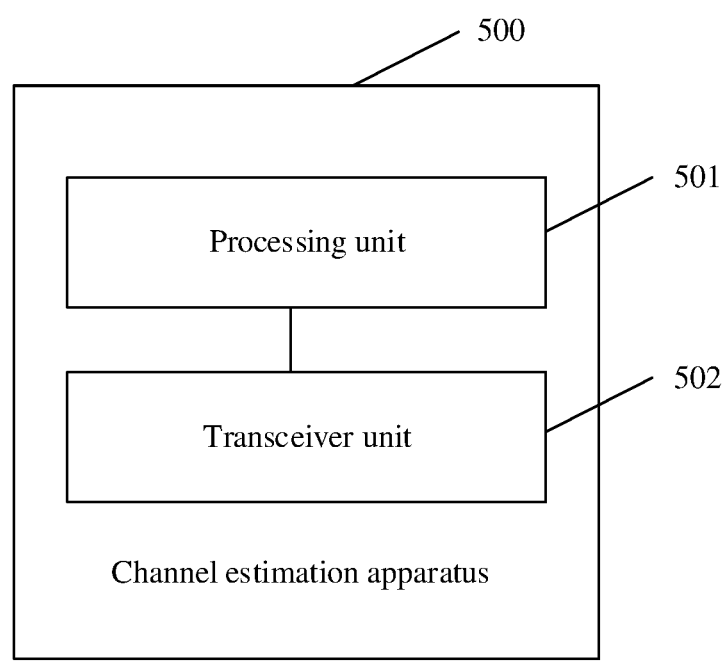
FIG. 5 is a schematic structural diagram of a channel estimation apparatus according to an embodiment of this application.

FIG. 5 is a schematic structural diagram of a channel estimation apparatus according to an embodiment of this application. The channel estimation apparatus 500 shown in FIG. 5 may be configured to perform the steps performed by the receive end device or the transmit end device in the channel estimation method shown in FIG. 3, or may be configured to perform the steps performed by the receive end device or the transmit end device in the channel estimation method shown in FIG. 4. The channel estimation apparatus 500 may include: a processing unit 501 and a transceiver unit 502.

In an implementation, the processing unit 501 may be configured to generate indication information, where the indication information is used to indicate M N-dimensional precoding vectors, each precoding vector is applied to one of M frequency bands, the M N-dimensional precoding vectors form an N×M or M×N space-frequency matrix, and the space-frequency matrix is generated by performing weighted combination on a plurality of space-frequency component matrices, where M≥1, N≥2, and both M and N are integers. The transceiver unit 502 may be configured to send the indication information. For example, with reference to FIG. 3, in this implementation, the channel estimation apparatus 500 may be specifically the receive end device in FIG. 3. The processing unit 501 may be configured to perform S101, and the transceiver unit 502 may be configured to perform S102.

In another implementation, the processing unit 501 may be configured to generate indication information, where the indication information is used to indicate M N-dimensional precoding vectors, each precoding vector is applied to one of M frequency bands, the M N-dimensional precoding vectors form an M×N-dimensional space-frequency vector, and the space-frequency vector is generated by performing weighted combination on a plurality of space-frequency component vectors. For example, with reference to FIG. 4, in this implementation, the channel estimation apparatus 500 may be specifically the receive end device in FIG. 4. The processing unit 501 may be configured to perform S201, and the transceiver unit 502 may be configured to perform S202.

In another implementation, the transceiver unit 502 may be configured to receive indication information, where the indication information is used to indicate M N-dimensional precoding vectors, each precoding vector is applied to one of M frequency bands, the M N-dimensional precoding vectors form an N×M or M×N space-frequency matrix, and the space-frequency matrix is generated by performing weighted combination on a plurality of space-frequency component matrices, where M≥1, N≥2, and both M and N are integers. The processing unit 501 may be configured to determine the M N-dimensional precoding vectors based on the indication information. For example, with reference to FIG. 3, in this implementation, the channel estimation apparatus 500 may be specifically the transmit end device in FIG. 3. The processing unit 501 may be configured to perform S104, and the transceiver unit 502 may be configured to perform S103.

In another implementation, the transceiver unit 502 may be configured to receive indication information, where the indication information is used to indicate M N-dimensional precoding vectors, each precoding vector is applied to one of M frequency bands, the M N-dimensional precoding vectors form an M×N-dimensional space-frequency vector, and the space-frequency vector is generated by performing weighted combination on a plurality of space-frequency component vectors. The processing unit 501 may be configured to determine the M N-dimensional precoding vectors based on the indication information. For example, with reference to FIG. 4, in this implementation, the channel estimation apparatus 500 may be specifically the transmit end device in FIG. 4. The processing unit 501 may be configured to perform S204, and the transceiver unit 502 may be configured to perform S203.

For explanations of related content, descriptions of beneficial effects, and the like in this embodiment, refer to the foregoing method embodiments, and details are not described herein again. In an example, with reference to the communications device shown in FIG. 2, the processing unit 501 may correspond to the processor 401 or the processor 408 in FIG. 2, and the transceiver unit 502 may correspond to the communications interface 404 in FIG. 2.

All or some of the foregoing embodiments may be implemented by using software, hardware, firmware, or any combination thereof. When a software program is used for implementation, the embodiments may be implemented completely or partially in a form of a computer program product. The computer program product includes one or more computer instructions. When the computer instructions are loaded and executed on a computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Although this application is described with reference to the embodiments, in a process of implementing this application that claims protection, a person skilled in the art may understand and implement another variation of the disclosed embodiments by viewing the accompanying drawings, disclosed content, and the accompanying claims. In the claims, "comprising" does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, it is clear that various modifications and combinations may be made to them without departing from the spirit and scope of this application. Correspondingly, the specification and accompanying drawings are merely example description of this application defined by the accompanying claims, and is considered as any of or all modifications, variations, combinations or equivalents that cover the scope of this application. It is clear that a person skilled in the art can make various modifications and variations to this application without departing from the spirit and scope of this application. In this case, this application is intended to cover these modifications and variations of this application provided that the modifications and variations fall within the scope of protection defined by the following claims and their equivalent technologies.

What is claimed is:

1. A communications apparatus comprising:
at least one processor configured with processor-executable instructions to perform operations including:
generating indication information for indicating M N-dimensional precoding vectors,
   wherein each precoding vector is applied to one of M frequency bands,
   wherein the M N-dimensional precoding vectors form a space-frequency matrix,
   wherein the space-frequency matrix is generated by performing a weighted combination on a plurality of space-frequency component matrices,
   wherein the space-frequency matrix is an X×Y space-frequency matrix, X and Y are one and the other of M and N, M≥1, N≥2, and both M and N are integers,
   wherein the space-frequency matrix is associated with one spatial stream of a plurality of spatial streams, and
   wherein quantities of frequency-domain component vectors associated with each of space-frequency matrices of different spatial streams of the plurality of spatial streams are the same; and
sending the indication information.

2. The communications apparatus according to claim 1, wherein each space-frequency component matrix is selected from a space-frequency component matrix set.

3. The communications apparatus according to claim 2, wherein the indication information indicates the plurality of space-frequency component matrices and a weight of each of the plurality of space-frequency component matrices.

4. The communications apparatus according to claim 1, wherein each of the plurality of space-frequency component matrices is constructed based on two vectors, and wherein one of the two vectors is constructed based on an N-dimensional space-domain component vector, and the other one is constructed based on an M-dimensional frequency-domain component vector.

5. The communications apparatus according to claim 4, wherein each space-domain component vector is selected from a space-domain component vector set and each frequency-domain component vector is selected from a frequency-domain component vector set.

6. The communications apparatus according to claim 4, wherein each space-domain component vector is selected from a space-domain component vector set and each frequency-domain component vector is selected from a frequency-domain component vector set, and
   wherein the indication information indicates a space-domain component vector and a frequency-domain component vector associated with each of the plurality of space-frequency component matrices, and a weight of the space-frequency component matrix.

7. The communications apparatus according to claim 4, wherein the plurality of space-frequency component matrices share a same group of space-domain component vectors and a same group of frequency-domain component vectors.

8. The communications apparatus according to claim 1, wherein quantities of space-domain component vectors associated with each of space-frequency matrices of different spatial streams of the plurality of spatial streams are the same.

9. The communications apparatus according to claim 1, wherein the apparatus is a communications chip.

10. A channel estimation method comprising:
generating indication information for indicating M N-dimensional precoding vectors,
   wherein each precoding vector is applied to one of M frequency bands,
   wherein the M N-dimensional precoding vectors form a space-frequency matrix,
   wherein the space-frequency matrix is generated by performing a weighted combination on a plurality of space-frequency component matrices,
   wherein the space-frequency matrix is an X×Y space-frequency matrix, X and Y are one and the other of M and N, M≥1, N≥2, and both M and N are integers,
   wherein the space-frequency matrix is associated with one spatial stream of a plurality of spatial streams, and
   wherein quantities of frequency-domain component vectors associated with each of space-frequency matrices of different spatial streams of the plurality of spatial streams are the same; and
sending the indication information.

11. The method according to claim 10, wherein each space-frequency component matrix is selected from a space-frequency component matrix set.

12. The method according to claim 11, wherein the indication information indicates the plurality of space-frequency component matrices and a weight of each of the plurality of space-frequency component matrices.

13. The method according to claim 10, wherein each of the plurality of space-frequency component matrices is constructed based on two vectors, and wherein one of the two vectors is constructed based on an N-dimensional space-domain component vector, and the other one is constructed based on an M-dimensional frequency-domain component vector.

14. The method according to claim 13, wherein each space-domain component vector is selected from a space-domain component vector set and each frequency-domain component vector is selected from a frequency-domain component vector set.

15. The method according to claim 13, wherein each space-domain component vector is selected from a space-domain component vector set and each frequency-domain component vector is selected from a frequency-domain component vector set, and
wherein the indication information indicates a space-domain component vector and a frequency-domain component vector associated with each of the plurality of space-frequency component matrices, and a weight of the space-frequency component matrix.

16. The method according to claim 13, wherein the plurality of space-frequency component matrices share a same group of space-domain component vectors and a same group of frequency-domain component vectors.

17. The method according to claim 10, wherein quantities of space-domain component vectors associated with each of space-frequency matrices of different spatial streams of the plurality of spatial streams are the same.

18. A non-transitory computer-readable storage medium storing computer instructions, that when executed by at least one processor, cause the at least one processor to perform operations comprising:
generating indication information for indicating M N-dimensional precoding vectors,
wherein each precoding vector is applied to one of M frequency bands,
wherein the M N-dimensional precoding vectors form a space-frequency matrix,
wherein the space-frequency matrix is generated by performing a weighted combination on a plurality of space-frequency component matrices,
wherein the space-frequency matrix is an X×Y space-frequency matrix, X and Y are one and the other of M and N, M≥1, N≥2, and both M and N are integers,
wherein the space-frequency matrix is associated with one spatial stream of a plurality of spatial streams, and
wherein quantities of frequency-domain component vectors associated with each of space-frequency matrices of different spatial streams of the plurality of spatial streams are the same; and
sending the indication information.

19. The non-transitory computer-readable storage medium according to claim 18, wherein each space-frequency component matrix is selected from a space-frequency component matrix set.

20. The non-transitory computer-readable storage medium according to claim 19, wherein the indication information indicates the plurality of space-frequency component matrices and a weight of each of the plurality of space-frequency component matrices.

21. The non-transitory computer-readable storage medium according to claim 18, wherein each of the plurality of space-frequency component matrices is constructed based on two vectors, wherein one of the two vectors is constructed based on an N-dimensional space-domain component vector, and wherein the other one is constructed based on an M-dimensional frequency-domain component vector.

22. The non-transitory computer-readable storage medium according to claim 21, wherein each space-domain component vector is selected from a space-domain component vector set and each frequency-domain component vector is selected from a frequency-domain component vector set.

23. The non-transitory computer-readable storage medium according to claim 21, wherein each space-domain component vector is selected from a space-domain component vector set and each frequency-domain component vector is selected from a frequency-domain component vector set, and
wherein the indication information indicates a space-domain component vector and a frequency-domain component vector associated with each of the plurality of space-frequency component matrices, and a weight of the space-frequency component matrix.

24. The non-transitory computer-readable storage medium according to claim 21, wherein the plurality of space-frequency component matrices share a same group of space-domain component vectors and a same group of frequency-domain component vectors.

25. The non-transitory computer-readable storage medium according to claim 18, wherein quantities of space-domain component vectors associated with each of space-frequency matrices of different spatial streams of the plurality of spatial streams are the same.

* * * * *

UNITED STATES PATENT AND TRADEMARK OFFICE
CERTIFICATE OF CORRECTION

| | |
|---|---|
| PATENT NO. | : 12,301,316 B2 |
| APPLICATION NO. | : 18/440664 |
| DATED | : May 13, 2025 |
| INVENTOR(S) | : Wang et al. |

Page 1 of 1

It is certified that error appears in the above-identified patent and that said Letters Patent is hereby corrected as shown below:

On the Title Page

Item (57) Abstract: Left-Hand Column, Line 2: "N24 2" should read as -- $N \geq 2$ --.

Signed and Sealed this
Fourteenth Day of October, 2025

John A. Squires
*Director of the United States Patent and Trademark Office*